(12) United States Patent
Hartmann et al.

(10) Patent No.: US 10,335,833 B2
(45) Date of Patent: Jul. 2, 2019

(54) SINGULATION CONVEYOR AND METHOD FOR CONVEYING AND SEPARATING PIECE GOODS ALONG AT LEAST ONE TRANSPORT TRACK

(71) Applicants: Bernd Hartmann, Grafschaft-Leimersdorf (DE); Wolfram Grafe, Elmenhorst (DE)

(72) Inventors: Bernd Hartmann, Grafschaft-Leimersdorf (DE); Wolfram Grafe, Elmenhorst (DE)

(73) Assignee: Deutsche Post AG, Bonn (DE)

( * ) Notice: Subject to any disclaimer, the term of this patent is extended or adjusted under 35 U.S.C. 154(b) by 0 days.

(21) Appl. No.: 15/596,861

(22) Filed: May 16, 2017

(65) Prior Publication Data
US 2017/0333952 A1    Nov. 23, 2017

(30) Foreign Application Priority Data

May 20, 2016   (DE) .................. 10 2016 109 315

(51) Int. Cl.
| | |
|---|---|
| *B07C 3/08* | (2006.01) |
| *B07C 5/02* | (2006.01) |
| *B65G 47/30* | (2006.01) |
| *B07C 5/342* | (2006.01) |
| *B65G 47/29* | (2006.01) |
| *B65G 47/46* | (2006.01) |
| *B65G 47/64* | (2006.01) |

(52) U.S. Cl.
CPC ............. *B07C 3/08* (2013.01); *B07C 5/02* (2013.01); *B07C 5/3422* (2013.01); *B65G 47/29* (2013.01); *B65G 47/46* (2013.01); *B65G 47/64* (2013.01); *B65G 47/30* (2013.01); *B65G 2201/0285* (2013.01)

(58) Field of Classification Search
CPC ............ B07C 3/08; B07C 5/02; B07C 5/3422
USPC ................................................ 209/552, 559
See application file for complete search history.

(56) References Cited

U.S. PATENT DOCUMENTS

| | | | | |
|---|---|---|---|---|
| 4,130,193 A | * | 12/1978 | Bourgeois | B65G 47/29 198/369.2 |
| 4,482,061 A | * | 11/1984 | Leverett | B07C 5/18 198/384 |
| 4,634,328 A | * | 1/1987 | Carrell | B07C 1/04 198/444 |

(Continued)

FOREIGN PATENT DOCUMENTS

| | | |
|---|---|---|
| DE | 10 2007 017 416 B3 | 6/2008 |
| EP | 0 278 909 A1 | 8/1988 |
| WO | WO 01/32533 A2 | 5/2001 |

*Primary Examiner* — Terrell H Matthews
(74) *Attorney, Agent, or Firm* — Reinhart Boerner Van Deuren P.C.

(57) ABSTRACT

A singulation conveyor for conveying and separating piece goods, in particular packages and/or consignments, along at least one transport track bearing the piece goods items is described, wherein in the transport track, in some sections, finger elements adjustable between a lower setting and an upper setting are provided, and wherein the free ends of the finger elements in the upper setting are arranged in an upper position above an adjoining region of the transport track in such a way as to manipulate the motional direction and/or the motional speed of respectively individual piece goods items independently of other piece goods items.

23 Claims, 17 Drawing Sheets

(56) References Cited

U.S. PATENT DOCUMENTS

| | | | | |
|---|---|---|---|---|
| 6,471,044 B1* | 10/2002 | Isaacs | ............ | B65G 43/08 |
| | | | | 198/347.4 |
| 6,619,550 B1* | 9/2003 | Good | ............ | B82Y 15/00 |
| | | | | 235/462.01 |
| 2004/0163929 A1* | 8/2004 | Mills | ............ | B07C 5/363 |
| | | | | 198/438 |
| 2006/0070854 A1* | 4/2006 | Boelaars | ............ | B65G 47/53 |
| | | | | 198/779 |
| 2013/0129887 A1* | 5/2013 | Hoppe | ............ | A22C 17/04 |
| | | | | 426/479 |

\* cited by examiner

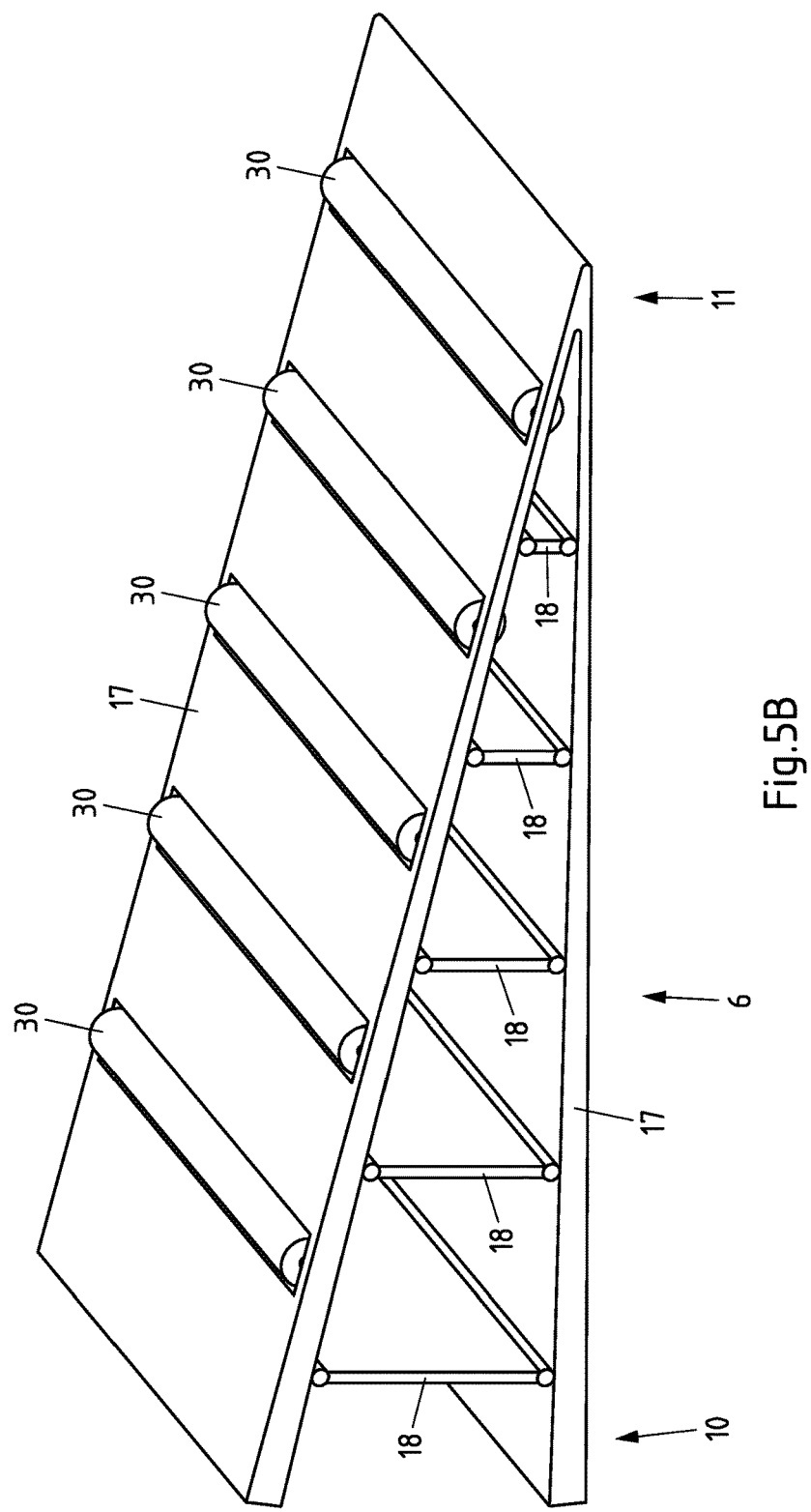

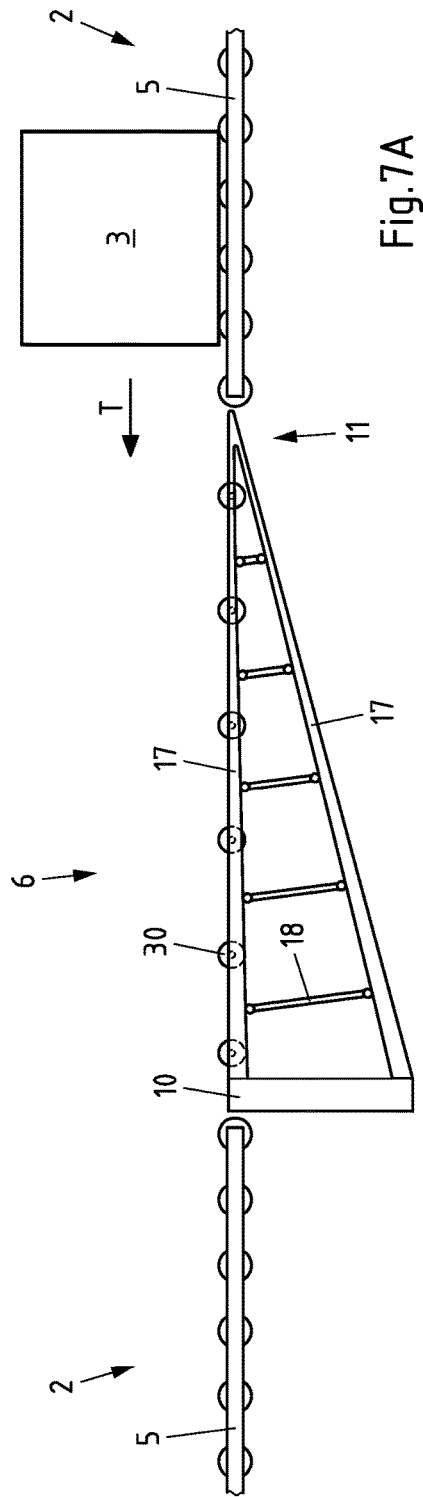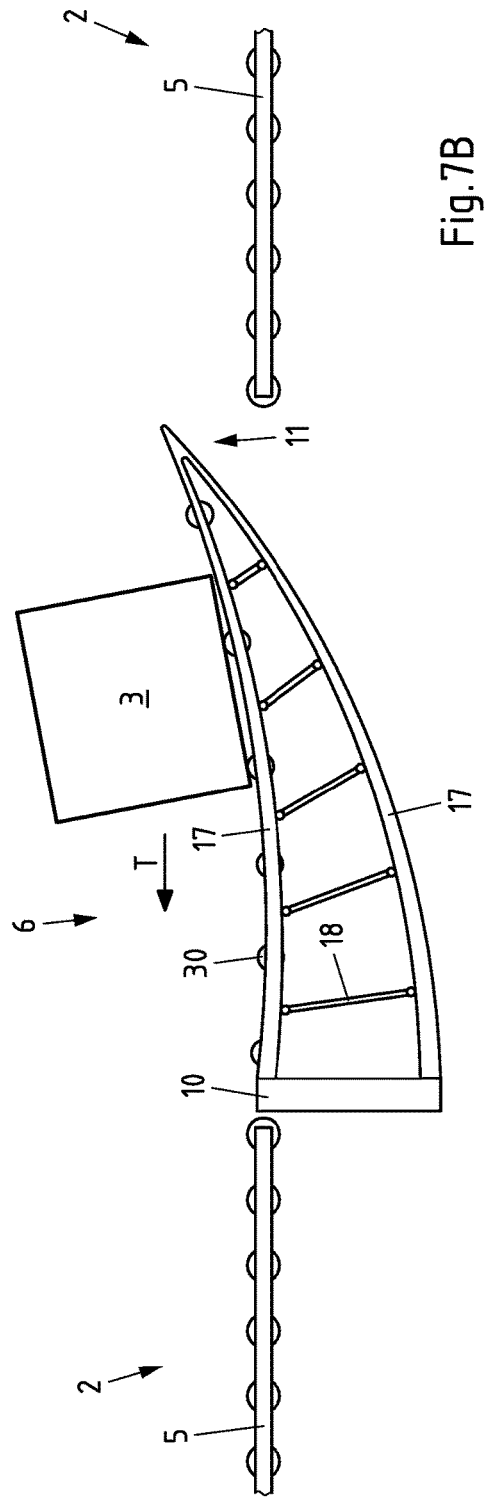

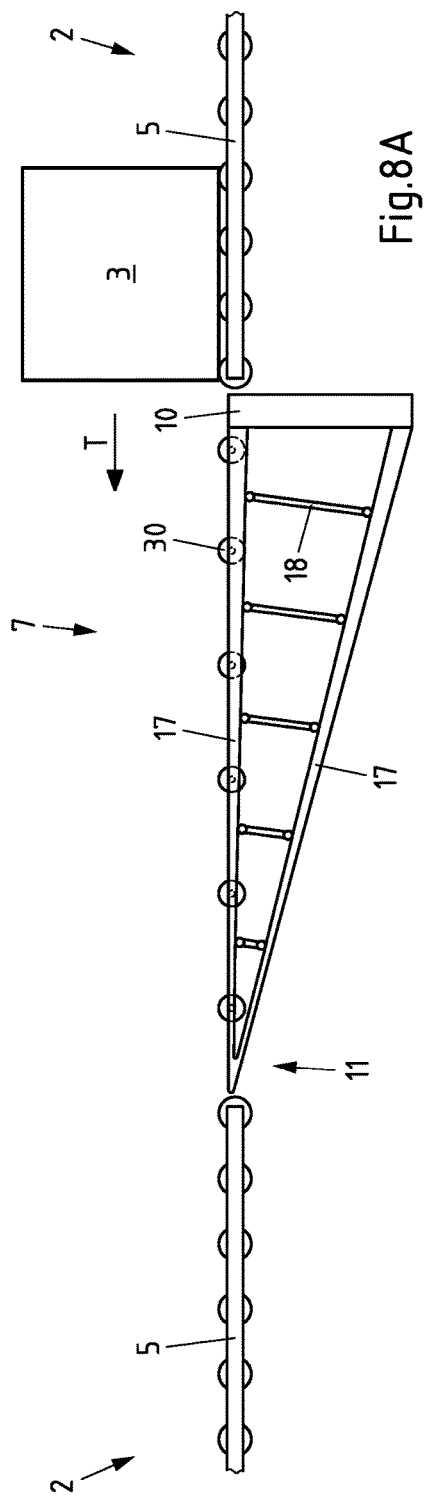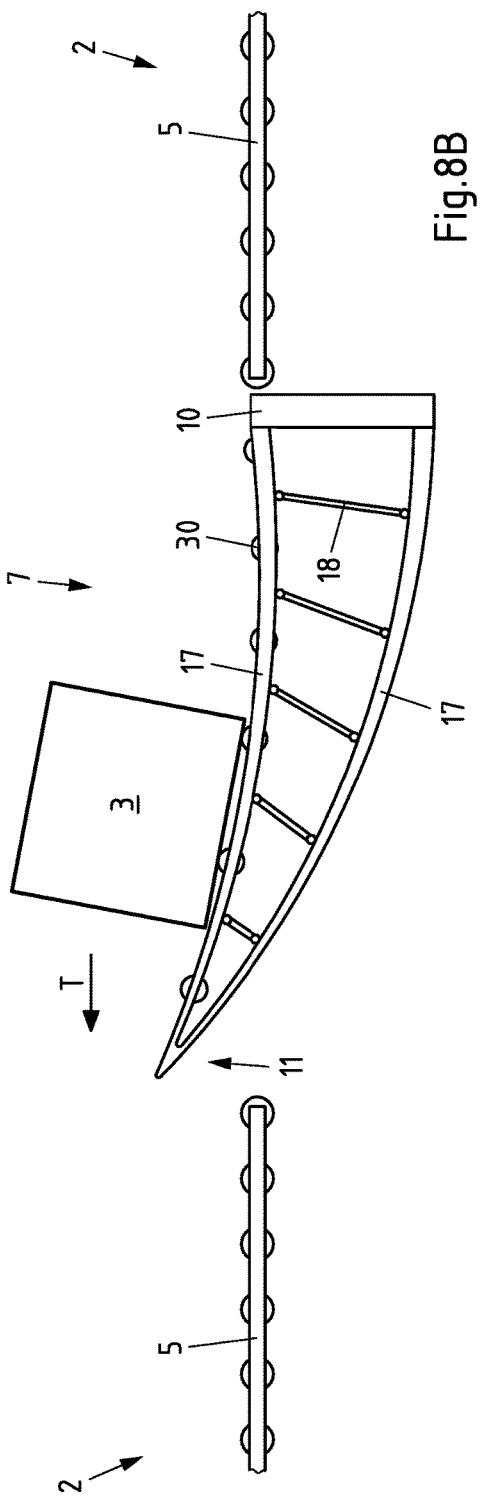

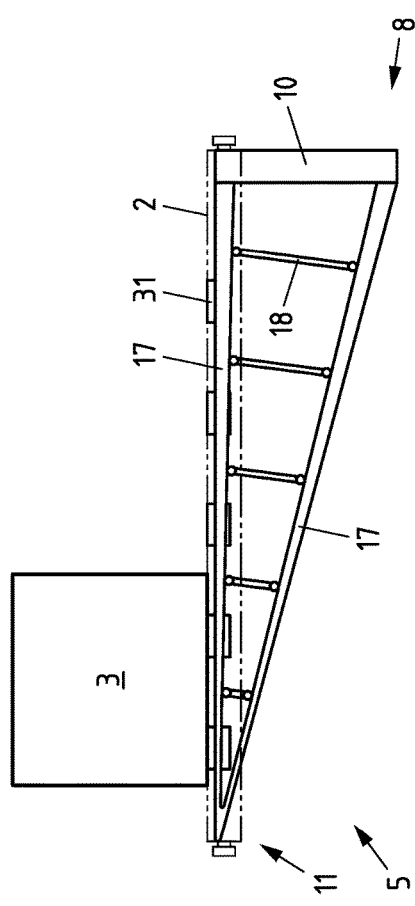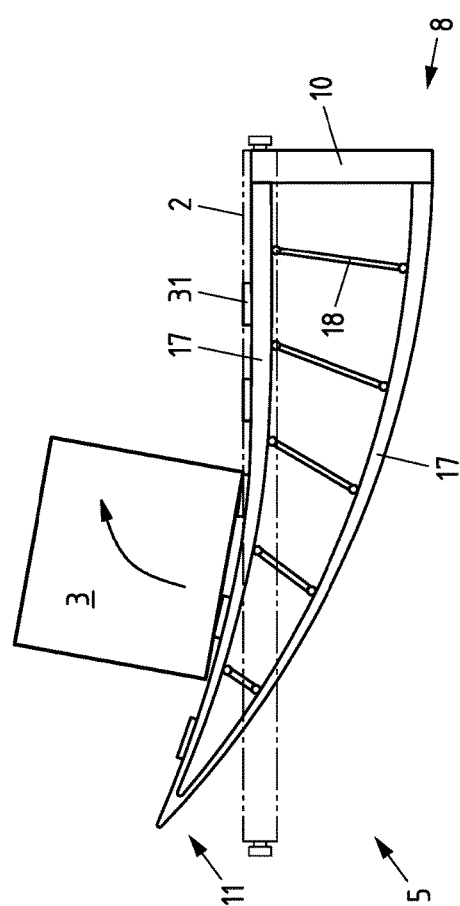

SINGULATION CONVEYOR AND METHOD FOR CONVEYING AND SEPARATING PIECE GOODS ALONG AT LEAST ONE TRANSPORT TRACK

CROSS-REFERENCE TO RELATED APPLICATION

This patent application claims priority to German Application No. 10 2016 109 315.7, filed May 20, 2016, the entire teachings and disclosure of which are incorporated herein by reference thereto.

FIELD OF THE INVENTION

The invention relates to a singulation conveyor for conveying and separating piece goods, in particular packages and/or consignments, along at least one transport track bearing the piece goods items. The invention further relates to a method for conveying and separating piece goods, in particular packages and/or consignments, along at least one transport track of a singulation conveyor of the aforesaid type, which transport track bears the piece goods items.

BACKGROUND OF THE INVENTION

Piece goods which are present in the form of heaps, stacks or the like must often be separated prior to further handling. After the separation, the piece goods can be sorted, for instance, to be precise in particular by automated plants. For the separation, the piece goods items are generally tipped onto a transporting device in the form of a singulation conveyor, which effects the transport of the piece goods items and the separation of the piece goods items along the transport track. The singulation or separation of the piece goods items is here typically achieved by virtue of the fact that additional motion components are impressed on the piece goods items conveyed along the transport track of the singulation conveyor. The motion components can be impressed one after another, and/or in different directions, on the piece goods. According to requirement, this happens repeatedly in order to separate the piece goods step by step. The separated piece goods items are distributed on the transport track preferably such that the piece goods items are spaced apart in at least one direction. The piece goods items can thus be spaced apart in the direction of transport of the singulation conveyor and/or transversely thereto. The thus separated piece goods items can then, for instance, be fed to sorting devices, in which the piece goods items are sorted according to predetermined criteria.

The transport track for the piece goods items is generally arranged in one plane. In the course of the transport track, the latter can however, also define different planes. In the respective plane formed by the transport track, the piece goods items rest on the transport track and in this position are moved by the singulation conveyor in the direction of transport. Thus the piece goods items are transported and separated along this at least one plane. The piece goods items are here generally transported at least substantially in a straight line. The piece goods can however, also be guided around bends. In this case, the extent of the transport track predetermines the direction of transport of the piece goods items, which can change along the transport track. Added to this is the fact that the piece goods items, for the purpose of the separation, can have a motion component transversely to the actual direction of transport. However, this motion component serves for the separation rather than for the transport, for which reason this additional motion component does not change the actual direction of transport of the piece goods items, so that piece goods items are moved in the same direction of transport and, at the same time, can be separated transversely thereto.

The piece goods items can be, for instance, products or merchandise. In particular, these are packages in the form of piece goods items, such as merchandise, consignments or other goods, which are packed with packagings. Consignments are typically delivered to specific addressees. Moreover, consignments are often constituted by packages, i.e. packed piece goods items. Prior to the delivery of the consignments to the addressees of the consignments, a presorting is in many cases realized in a delivery base station, for example according to the geographical area of the addressees. The delivery base station can be constituted, for instance, by a so-called parcel centre, a depot or the like. The consignments can be delivered after the sorting or else can be further sorted, which can be realized, for instance, at a different location from the preceding sorting. The delivery can be made to addressees of the consignments or to appropriate distribution points, such as, for instance, parcel boxes or packing stations.

As piece goods items, packages and/or consignments are regarded in the present case very different items, which can preferably be transported at reasonable cost with regard to their size and weight. Everyday necessities, such as consumables or food products, qualify just as much as technical items and equipment. In many cases, the consignments are constituted by letter-post items, parcel-post items and/or flyers. Parcel-post items here also embrace packets, whilst flyers can also be pamphlets, brochures and magazines.

Singulation conveyors frequently have strap conveyors having driven straps or belts, roller conveyors having rotatable rollers or rolls, or chain conveyors having revolving chains. To this can then also be added devices for separating the piece goods items. Thus singulation conveyors which have straps or belts, driven at different speeds, for separating the piece goods along the direction of transport are known, for instance. Branching devices, which distribute the piece goods transversely to the actual direction of transport of the piece goods, can, however, also be provided.

The known singulation conveyors are often very complex in terms of equipment, in some cases require a lot of space and can only conditionally be used in relation to the piece goods items to be separated.

BRIEF SUMMARY OF SOME EXEMPLARY EMBODIMENTS OF THE INVENTION

The object of the present invention is to design and refine the singulation conveyor and method respectively of the type stated in the introduction and described previously in detail, such that the conveyance and separation of the piece goods can be realized more simply in terms of equipment, in a more space-saving manner and in a way which is better adaptable to the piece goods items to be separated.

This object is achieved in a singulation conveyor according to embodiments described in the claims by virtue of the fact that in the transport track, in some sections, finger elements adjustable between a lower setting and an upper setting are provided, and that the free ends of the finger elements in the upper setting are arranged in an upper position above an adjoining region of the transport track in such a way as to manipulate the motional direction and/or the motional speed of respectively individual piece goods items independently of other piece goods items.

The said object is additionally achieved according to embodiments of a method as described in the claims for conveying and separating piece goods, in particular packages and/or consignments, along at least one transport track of a singulation conveyor, which transport track bears the piece goods items, wherein in the transport track, in some sections, finger elements adjustable between a lower setting and an upper setting are provided, wherein the free ends of the finger elements in the upper setting are arranged in an upper position above an adjoining region of the transport track, in which the finger elements are repeatedly adjusted out of the lower setting into the upper setting so as manipulate the motional direction and/or the motional speed of respectively individual piece goods items independently of other piece goods items, and in which the piece goods items are separated by the repeated adjustment of the finger elements out of the lower setting into the upper setting along the transport track and/or transversely to the transport track.

By the finger elements in the transport track, a slight manipulation of the motional direction of the piece goods items independently of other piece goods items, in particular of adjacent piece goods items, can be achieved. A purposeful manipulation of the movement of individual piece goods items is thus possible. A piece goods item which traverses a finger element can here be manipulated in its motional direction by adjustment of the finger element into the upper setting. Unlike, for instance, in straps of strap conveyors, which straps are driven at different speeds, this is, however, not necessary. According to requirement, the adjustment of the finger elements does not have to follow the consistently same principle, but rather an adaptation can be made to the respective situation with regard to the desired separation. The manipulation of the piece goods items in terms of their movement is realized by a finger element preferably only in a setting which is raised over the transport track. According to requirement, however, a finger element can here be raised differently far according to the desired manipulation of the movement of a piece goods item. According to requirement, the finger elements can thus assume different settings between an upper and a lower setting and maintain these for a certain time. Moreover, the manipulation of the movement of piece goods items can be realized according to the nature of the finger elements and their adjustment both in terms of direction and in terms of speed.

A further advantage is that the finger elements can be configured with small dimensions, which reduces the spatial requirement for the singulation conveyor and allows the purposeful separate manipulation of individual piece goods items independently of the adjoining piece goods. Moreover, a large number of finger elements can thus be integrated in a singulation conveyor in order to be able to perform very many different and respectively minor manipulations of movements of piece goods items. Furthermore, the finger elements do not have to remain in their respective setting, but can repeatedly be adjusted upwards and downwards while the finger elements are traversed by the piece goods to be separated. In this way, the separation can be realized in a very purposeful manner without considerable investment in equipment and/or without the need for a very large singulation conveyor.

In the following, for the sake of easier understanding and in order to avoid unnecessary repetitions, the singulation conveyor and the method are jointly described without constantly specifically differentiating linguistically between the singulation conveyor and the method. To the person skilled in the art, it will respectively be evident, on the basis of the context, which features are preferred in respect of the singulation conveyor and in respect of the method.

In a first, particularly preferred embodiment of the singulation conveyor, this has, at least in some sections, at least one roller conveyor, belt conveyor and/or strap conveyor, which can also be regarded as a band conveyor. The at least one roller conveyors, belt conveyor and/or strap conveyor thus effects the actual transport of the piece goods along the transport track, to be precise without involvement of the finger elements, which, however, according to requirement, can aid the appropriate transport. As a result, the transport track, at least contiguously to the finger elements and/or at least with the exception of the finger elements, is preferredly provided by at least one roller conveyor, belt conveyor and/or strap conveyor. The finger elements can thus be provided between appropriate conveyors or possibly integrated in these. In other words, the finger elements can be distributed along the transport track, wherein the finger elements do not have to be distributed evenly along and/or transversely to the transport track. For instance, sections consisting of or having finger elements and sections without finger elements can follow one upon another or alternate. Next to, in front of, behind and/or between finger elements, conveyors of the said type can then be provided. Alternatively, the finger elements can also be integrated in the conveyors along the transport track. This is particularly easily possible in the case of roller conveyors. Irrespective thereof, it is preferred if the at least one roller conveyor is slightly inclined in the direction of transport of the piece goods items. Hence the transport track, in particular where at least one roller conveyor is used, can thus have a slight inclination in order to be able to make use of gravity for the transport of the piece goods items. The finger elements can be arranged in such a way in or between conveyors that the finger elements at least partially bear the piece goods items when the finger elements are arranged in the upper setting. The piece goods items thus do not rest flatly on the transport track, but are raised slightly by the finger elements, which results in a manipulation, i.e. an at least slight alteration, of the motional direction and/or motional speed of the piece goods items.

The arrangement of the finger elements in relation to the transport track or in relation to the direction of transport of the piece goods items along the transport track determines the direction in which the motional direction of the individual piece goods items is manipulated by the finger elements. This is substantially based on the fact that the fingers are fixed with one end to the transport track or the singulation conveyor, whilst the free end of the finger elements can respectively be raised in order to adjust the finger elements into the upper setting. For the purposeful manipulation of the piece goods items and separation of these same, at least some finger elements can point in the direction of the free ends of the respective finger elements at least substantially in the direction of transport of the piece goods items along the transport track. In other words, preferably some finger elements point with their free ends at least substantially in the direction of transport of the piece goods items. If the finger elements are raised into the upper setting, the finger elements obstruct the piece goods items, yet without preventing the onward transport of the piece goods items. The piece goods items must make their way at least partially over the finger elements. This can result in a braking of the piece goods items, without the piece goods items being driven over the finger elements. Alternatively or additionally, finger elements, which point with their free ends at least substantially counter to the direction of transport of the piece goods items along the transport track, can be provided. If the finger elements are raised into the upper setting, the finger elements can impede the onward transportation of the piece goods items in the direction of transport, in that the piece goods butt against the free ends of the finger elements. If, on the other hand, the finger elements are only raised once the piece goods have already largely or even wholly traversed the free ends of the finger elements, the piece goods can be accelerated by the raised finger elements. Irrespective of the direction in which the finger elements are pointing, it can be that the piece goods items are raised by the finger elements only on one side. Additionally or alternatively, a motion component is then possibly also impressed on the piece goods transversely to the direction of transport, to be precise to the side which points away from the free end of the finger element. The appropriate manipulation of the motional direction of the piece goods items can lead in one way or another to a separation of the piece goods items, to be precise in particular where the movements of at least some piece goods items along the transport track one after another are manipulated on several occasions by different finger elements.

It is particularly preferred if the finger elements pointing at least substantially in the direction of transport or counter to the direction of transport are not too wide, so that only individual, in particular specific piece goods items, are manipulated with respect to the movement. Were the finger elements to extend over the entire width of the transport track, all piece goods items, arranged side by side, would be manipulated, to be precise, if need be, in the same manner, which can be prejudicial to a purposeful and rapid separation. The width at least of some finger elements transversely to the transport track is thus preferably less than 50%, preferably less than 23%, in particular less than 18%, further particularly less than 10%, of the width of the transport track in the region of the finger elements. The lower the value, the more flexible and more purposeful the separation. However, according to requirement, more finger elements are then necessary to allow these to be distributed at suitable distances apart over the width of the transport track. Alternatively or additionally, it is preferred if the length of at least some finger elements in the direction of the free end is less than 18%, preferably less than 10%, in particular less than 5%, further particularly less than 2%, of the length of the transport track. In this way, the finger elements can easily be adjusted into the upper setting and back. In this way, furthermore, on a shorter transport path, a plurality of finger elements can be provided one behind another in the transport track in order to be able to accomplish the separation step by step and with low spatial requirement.

Irrespective of the previously described finger elements, the free ends of at least some finger elements can point at least substantially transversely to the direction of transport of the piece goods items along the transport track. The finger elements can here point at least substantially in the same direction, or else at least substantially in opposite directions transversely to the direction of transport of the piece good items or transversely to the transport track. The finger elements can be raised at the free end and in this way adjusted into the upper setting. The piece goods items transported over the fingers are thus raised further on one side than on the other side or in relation to the transport track. In this way, a sideways motion component is impressed on the appropriate piece goods as a result of the weight force. If the finger elements point in opposite directions, motion components both to the right and to the left, viewed in the direction of transport of the piece goods or along the transport track, can thus easily be impressed on the piece goods items in order thus to achieve a separation transversely to the direction of transport of the piece goods items or transversely to the transport track.

In the case of the finger elements oriented transversely to the transport track or to the direction of transport of the piece goods items, it is expedient if these do not extend over the entire width of the transport track, so that a motional direction to the same side is impressed by means of a finger element specifically on individual and not all piece goods items arranged side by side. Therefore the length of at least some finger elements in the direction to the free end transversely to the transport track is less than 50%, preferably less than 23%, in particular less than 18%, further particularly less than 10%, of the width of the transport track in the region of the finger elements. The shorter are configured the finger elements, the more likely can sideways motion components be impressed on piece goods items, arranged side by side, independently of one another. For this purpose, however, all the more finger elements must be distributed, according to requirement, over the width of the transport track, so that motion components can be impressed on the desired piece goods items when these are advanced spread over the width of the transport track. Alternatively or additionally, the width of at least some finger elements oriented transversely to the transport track can be less than 10%, preferably less than 5%, in particular less than 2%, further particularly less than 1%, of the length of the transport track. In this way, not as much space is required for the appropriate manipulation of the movement of piece goods items and there is more space available for further finger elements in order subsequently to impress on the piece goods a motion component in the same or a different direction.

The finger elements can preferably be configured such that the piece goods items are not fully, in particular not substantially, braked by the finger elements, so as not to excessively compromise the method for conveying the piece goods items and separating these same along the transport track. For this purpose, the finger elements can be provided with an appropriately smooth surface. Still more preferredly, it will be proper, however, for the finger elements to have transport means for transporting the piece goods items, preferably in the direction of transport of the piece goods items along the transport track. A conveyance of the piece goods in the direction of transport of the same is in any event ensured. The transporting devices can have rotatable rollers or rolls. However, movable straps or belts are also conceivable. The rollers and rolls here require, according to requirement, no dedicated drive, whilst the straps or belts of the finger elements can be motor-driven. In other words, the finger elements form according to requirement, independently of the rest of the transport track, roller, strap and/or belt conveyors.

Alternatively or additionally, the at least one transport track can be formed at least in some sections, in particular contiguously to at least some finger elements, by at least one roller conveyor, belt conveyor and/or strap conveyor. Appropriate conveyors here serve for the basic transport of the piece goods items along the transport track, whilst this transport can be aided, according to requirement, by the finger elements. The finger elements can also however, by dedicated conveyors, reinforce the manipulation of the motion components of the piece goods items. In this respect, the piece goods items can be purposefully influenced in order to separate them. Moreover, along the transport track different conveyors, which can belong to the same type, can be provided. Thus a plurality of strap conveyors can be provided, for instance, the straps of which are driven, according to requirement, at different speeds. Different types of conveyors can, however, also be provided at different places on the transport track. Thus the transport track can be configured, for instance, predominantly as a roller conveyor, yet can additionally, in some sections, have at least one strap conveyor for the acceleration of the piece goods items.

In order to further save space or to sort the piece goods items, it can be expedient if, at least in some sections, two transport tracks are provided one above the other. Moreover, the finger elements of at least one transport track can then be arranged such that, by an adjustment of the finger elements into the upper setting and/or the lower setting, a connection of one transport track to the at least one other transport track is created. In this way, it can then be achieved that the piece goods items are transported onwards from one transport track down onto another transport track, up onto a likewise other transport track, and/or on the at least one transport track. Here, different combinations are possible. For instance, it can be the case that the distributed piece goods items are subsequently further separated on at least two transport tracks independently of one another, which can result in a considerable space saving. Alternatively or additionally, a sorting of the piece goods items can be realized, in that these, according to the setting of the finger elements, are distributed to a further transport track upwards and/or a further transport track downwards. It can here also be provided that piece goods items, according to requirement, are transported onward along the same transport track and are not led upwards or downwards onto another transport track. In the case of a plurality of finger elements arranged side by side, these can preferably be adjusted such that adjacent piece goods items are forwarded at different times. Thus one piece goods item, for instance, can be led straight ahead along the same transport track, whilst at the same time another piece goods item is led upwards onto another transport track and/or another piece goods item down onto another transport track.

With respect to the adjustability of the finger elements, it is particularly preferred if the finger elements respectively have at least two flexible flank elements which extend jointly in the longitudinal direction of the finger element at least substantially up to the free end of the finger element, wherein the flexible flank elements are preferably flexibly connected to one another in the longitudinal direction of the finger elements respectively via a plurality of cross-pieces. In this way, the free ends of the finger elements can easily be adjusted from a lower setting into an upper setting and back. Moreover, the adjustment of the finger elements, in particular into the upper setting, can be accompanied by an arching of the finger elements. In a non-raised setting of the finger elements, these can have an elongated orientation. Upon the adjustment downwards out of this elongated orientation, a arching of the finger element, to be precise in particular in the opposite direction, can then, in turn, ensue. Moreover, the finger elements can make use of the so-called fin ray effect, which has been observed in tail fins of bony fish. If one presses laterally against them with one's finger, the fins, due to of the fin ray effect, do not flex away, but instead bend counter to the finger. This is made possible by the specific structure of the fins, which is recreated by the finger elements in the embodiment described above.

For this purpose, the finger elements have at least two flexible flank elements jointly extending from one end of the finger element to an opposite end of the finger element. The flexibility of the flank elements can be provided, for instance, by elastic flank elements or by a link chain made up of rigid chain links pivotably or articulately connected to one another. An appropriate flexibility is here demanded merely in one spatial direction. In the spatial directions perpendicular thereto, flexibility is not absolutely necessary. Therefore the flank elements can also without difficulty be configured, for instance, in the shape of a strip, wherein in the plane of the strip an increased flexural rigidity can be obtained. Alternatively, a rod-shaped design of the flank elements is, however, also possible. The appropriate flexibility of the flank elements ultimately allows a arching of the finger unit, starting from an elongated setting, into an arched setting, for instance similar to the arching of a finger, in particular upwards or downwards.

In order that the arching of the finger elements in one direction can be triggered, for instance, by a pressure against the finger unit, in particular against a flank element, in the opposite direction, the at least two flank elements between the two ends of the finger elements are respectively flexibly connected to one another via a plurality of cross-pieces. The cross-pieces can here be of rigid configuration and pivotably or articulately connected to the flank elements. According to requirement, alternatively to pivotable or articulate connections to the at least two flank elements, flexible, in particular elastic, cross-pieces can also, however, be used. In this way, the cross-pieces are able to be pivoted in relation to the at least two flank elements in order thus to enable a arching of the finger element.

The structure of the finger elements allows, where appropriate, a arching of these same when, for example, a piece goods item presses onto a finger element. Due to their structure, the finger elements can in particular, however, be purposefully arched, which results in a raising or lowering of the free end of the finger elements without the need for contact, for example, with a piece goods item. The arching or adjustment of the finger elements, with the focus on, in particular, the raising and lowering of the free ends of the finger elements, is realized, for instance, by a mutual adjustment of the flank elements in the longitudinal direction of the appropriate finger elements. The shape of the finger elements is then forcibly obtained, to be precise in particular in dependence on the mutual connection of the flank elements via the cross-pieces therebetween. In a simple embodiment, the flank elements, in one setting of a finger element, can be oriented in mirror symmetry, and/or the cross-pieces can be oriented parallel to one another. An unintended arching of the finger elements by the weight force transmitted from the piece goods to the finger elements can be avoided by prevention of a mutual adjustment of the flexible flank elements.

In order to be able to adjust the finger elements, for instance, not just in one plane, the finger elements can, for instance, also have three or more flank elements, which are mutually connected via cross-pieces. However, an adjustability of the finger elements in one direction, namely in particular the vertical direction, will normally be sufficient.

In order to be able to ensure a suitable mobility and thus the adjustability of the finger elements, it is expedient if the cross-pieces and the associated flexible flank elements form to one side an acute angle of preferably between 10° and 80° and to the other side an obtuse angle of preferably between 100° and 170°. By contrast, right angles can impede or restrict the adjustability of the finger elements.

In order to be able to adjust the finger elements and, in so doing, raise and re-lower the free ends of the finger elements in the desired manner, the flexible flank elements of the finger elements can respectively be mutually adjustable in the longitudinal direction of the finger elements. In order to be able to adjust the finger elements as far as possible independently of one another, it is expedient if the flank elements of different finger elements can be differently adjusted. The adjustment of the flank elements is preferably realized with at least one appropriate drive unit, via which finger elements can be actuated in the desired manner in order to ensure the desired setting of the finger elements. According to requirement, the separate adjustment of the finger elements can easily be achieved in that, at least in part, separate drive units are assigned to the various finger elements. In this way, a high flexibility in the separation is achieved and the separation is enabled already after a short transport path. Particularly preferredly, the finger elements can at least substantially all be adjusted independently of one another. This can require a large number of drive units, however. For instance, a drive unit can be assigned to at least substantially each finger element.

In order to achieve a purposeful separation of the piece goods items, it can be preferred if at least one, preferably optical, sensor is provided to capture piece goods items to be separated, in order thus to be able to adapt the separation to the respective requirements. The at least one sensor here preferably captures the number, type and/or position of individual piece goods items to be separated, the dimensions of individual piece goods items, the arrangement of a heap of piece goods items and/or the shape of a heap of piece goods items. All these parameters can separately or together have effects upon an optimally rapid and targeted separation. These effects can be taken into account when the parameters are captured. According to requirement, a plurality of sensors can be provided along the transport track. In this way, an adaptation of the separation can in many cases be realized on the basis of an actual state.

For a suitable controlling of the separation with due regard to relevant interrelationships in regard to the separation, at least one control device for controlling the adjustment of at least some finger elements on a time-dependent basis, in dependence on the number and/or type of individual piece goods items and/or in dependence on at least one parameter captured by the sensor, can be provided.

Alternatively or additionally it is preferred to provide an actuating device for adjusting the height of the free ends of the finger elements on a time-dependent basis, in dependence on the number and/or type of individual piece goods items, in dependence on at least one parameter captured by the sensor and/or in dependence on signals of the control device. The at least one actuating device can, for instance, actuate the drive units for adjustment of the finger elements. The actuating device then predetermines the adjustment or setting of the finger elements, whilst the drive unit mechanically effects the adjustment of the finger elements.

In a first, particularly preferred embodiment of the method, in accordance with the above statements regarding the singulation conveyor, it is in particular provided that individual piece goods items are accelerated by the adjustment of finger elements, pointing in the direction of transport of the transport track, from the lower setting into the upper setting, in particular in relation to other adjoining piece goods items, and/or that individual piece goods items are braked by the adjustment of finger elements, pointing counter to the direction of transport of the transport track, from the lower setting into the upper setting, in particular in relation to other adjoining piece goods items. The acceleration of the piece goods items can easily be realized by the finger elements, in particular the free ends of the finger elements, raising the rear end of the piece goods in relation to the front end of the piece goods. Due to the weight force acting on the piece goods, these are accelerated in the direction of transport of the transport track, whilst the piece goods items slide down from the finger element in the direction of transport. The braking can here be realized by the finger elements, in particular the free ends of the finger elements, raising the front part of the piece goods items in relation to the rear part of the piece goods items. The piece goods items must consequently make their way over the free ends of the finger elements, whereupon they lose speed. Moreover, the piece goods items can here further be raised on one side, which can lead to a situation in which the piece goods items, additionally to an acceleration or braking, slip somewhat further to the side which lies opposite the side raised by the finger element.

Alternatively or additionally, finger elements oriented transversely to the direction of transport of the piece goods items or transversely to the transport track can also be adjusted from a lower setting into an upper setting. The motional directions of the piece goods items at least partially raised by the finger elements are here manipulated such that a motion component in a direction transversely to the direction of transport of the piece goods items or transversely to the transport track is impressed on individual piece goods items, in particular in relation to other adjoining piece goods. If the finger elements, moreover, are oriented in opposite directions transversely to the direction of transport of the piece goods items or transversely to the transport track, motion components to opposite sides of the transport track or transversely to the transport track or transversely to the direction of transport of the piece goods items can be impressed on the piece goods items, whereby an appropriate manipulation and separation of the piece goods items can be achieved.

The finger elements of the transport track can preferably be adjusted independently of one another into the upper setting and back, so that, at least temporarily, some finger elements are arranged in the upper, and some finger elements, in particular pointing in the same direction and/or the opposite direction, are arranged in the lower setting. In this way, motion components in different directions and/or no additional motion component is/are ultimately impressed on different piece goods items on the transport track. A separation of the piece goods items can thus be achieved very quickly and efficiently.

If, with at least one, in particular optical, sensor, at least individual piece goods items on the transport track, which piece goods items are to be separated, are captured, their position relative to one another, arrangement, size, shape and the like can be determined. On these parameters, if need be also further parameters, depends how the piece goods items can be separated in a simple, purposeful and rapid manner. There can thus be provided, for instance, at least one control device, which, on the basis of the parameters captured by the at least one sensor, determines a suitable adjustment of at least individual of the finger elements, to be traversed by the piece goods items to be separated, for the separation of the piece goods items. This adjustment of the finger elements, which has been recognized as suitable, can then be correspondingly used to separate the piece goods items.

For this purpose, it is favourable according to the method if the control device sends appropriate signals, to at least one actuating device for adjustment of the finger elements, to adjust the finger elements such that the piece goods items to be separated are separated. The actuating device can here predetermine the adjustment of the individual finger elements or actuate drive units for adjustment of the finger elements, which drive units mechanically effect the adjustment of the finger elements.

By the adjustment of finger elements into an upper setting, piece goods items can be led, for instance, from one transport track upwards onto another, above-situated transport track. However, it can also be provided that piece goods items are led, by an adjustment of the finger elements into a lower setting, from one transporting device onto another below-situated transport track. Finger elements are possibly, however, also brought into a setting in which the piece goods items are led further along the same transport track. According to requirement, the additional transport tracks can then be configured and operated according to the same principle as the first transport tracks. Thus a plurality of transport tracks for separating and, according to requirement, likewise for sorting purposes can then be provided and utilized accordingly.

According to the method, the piece goods items can thus be separated on the at least two transport tracks by the repeated adjustment of finger elements of the respective transport track out of the lower setting into the upper setting along the respective transport track and/or transversely to the respective transport track. This functions preferredly according to the same principles and mechanisms which have already been described previously.

Alternatively or additionally to the separation of piece goods items, the singulation conveyor can also be used for the sorting of piece goods items. By the repeated adjustment of finger elements of the respective transport track out of the lower setting into the upper setting, the piece goods items can here be moved along the respective transport track and/or transversely to the respective transport track, in different manner, to at least one side of the transport track. This can already constitute the sorting operation. It can, however, also be provided that the piece goods items at predetermined places are moved down to at least one side of the transport track, in particular are discharged from the transport track, for example in chutes. Thus piece goods of the same category, for instance, can be moved down from the transport track at the same places and subsequently collected or transported onward in a suitable manner.

BRIEF DESCRIPTION OF THE SEVERAL VIEWS OF THE DRAWING

The invention is explained in greater detail below on the basis of a drawing representing merely illustrative embodiments. In the drawing.

FIGS. 5A-B show a finger element of the transport track from FIG. 1 in a side view and a perspective view;

FIGS. 7A-B show the function of a first section of the transport track from FIG. 1 in a schematic side view;

FIGS. 8A-B show the function of a second section of the transport track from FIG. 1 in a schematic side view;

FIGS. 9A-B show the function of a third section of the transport track from FIG. 1 in a schematic side view;

DETAILED DESCRIPTION OF THE INVENTION

Figure 1:
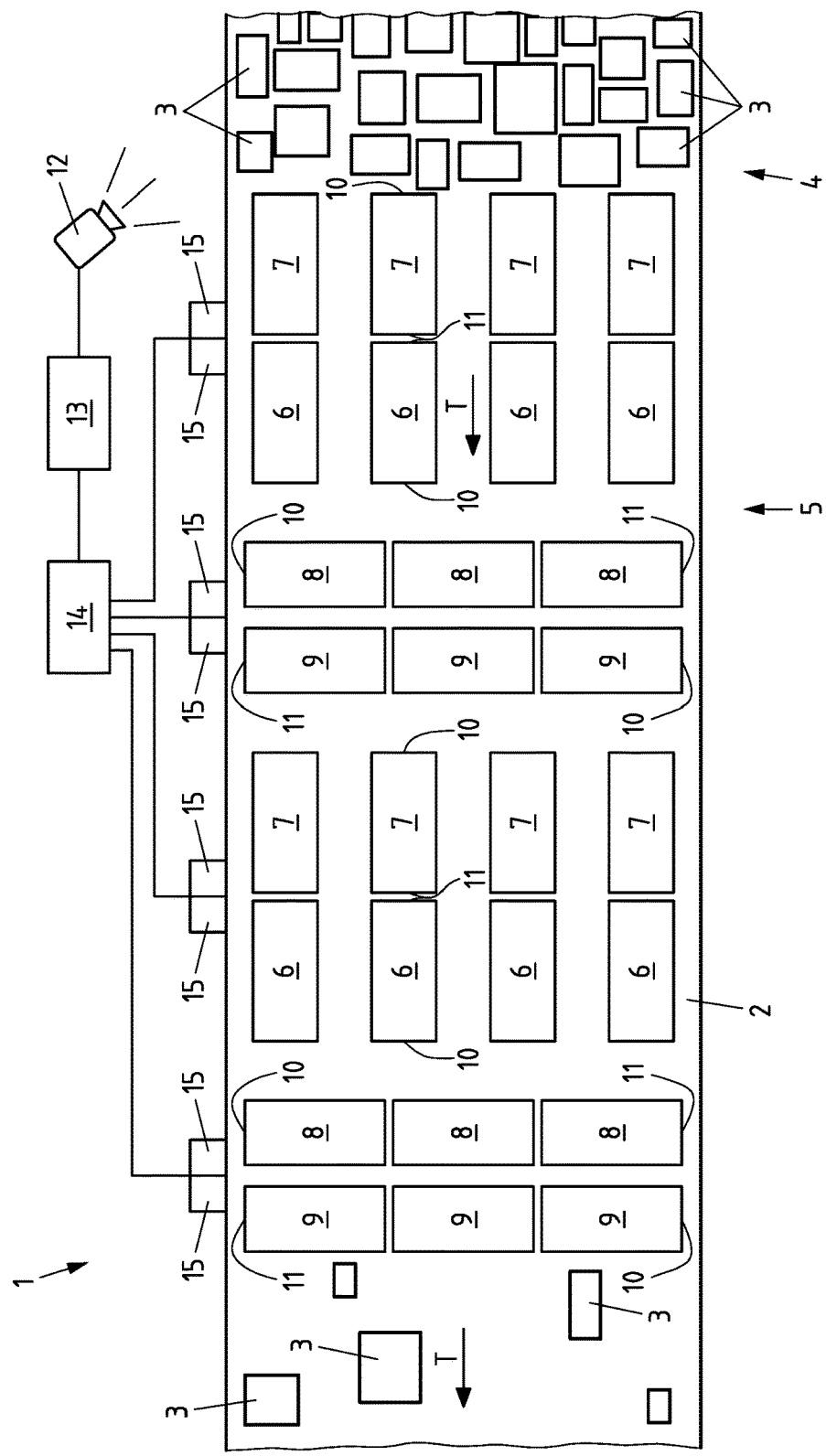
FIG. 1 shows a part of a transport track of a singulation conveyor according to the invention in a schematic top view.

In FIG. 1, a part of a singulation conveyor 1 comprising a transport track 2 is represented in schematic top view. The transport track 2 is oriented, at least in the represented extent, in a straight line, which, however, would not necessarily have to be the case. In the represented and, to this extent, preferred part of a transport track 2, both the longitudinal extent of the transport track 2 and the direction of transport T of the piece goods items 3 conveyed along the transport track 2 and separated are directed in a straight line from right to left. For the sake of better clarity and easier understanding, the piece goods items 3 are represented merely schematically as a pile 4 on the right-hand side and, spaced apart after the at least partial separation, on the left-hand side of FIG. 1. Between these two positions, the piece goods items 3 are transported along the singulation conveyor 1 configured as a roller conveyor 5. In the roller conveyor 5, which forms the transport track 2 on which the piece goods items 3 are conveyed, are integrated individual finger elements 6, 7, 8, 9. The finger elements 6, 7, 8, 9 are provided in different orientation, thus there are finger elements 6, 7, which are oriented parallel to the direction of transport T of the piece goods items 3, and finger elements 8, 9, which are oriented transversely to the direction of transport T of the piece goods items 3. In-between, the transport track 2 has rollers (not represented) of the roller conveyor 5, which ensure a substantially unimpeded transport of the piece goods items 3.

The finger elements 6, 7, 8, 9 have in the longitudinal direction respectively an end 10 fixedly connected to the roller conveyor 5, and a free end 11, which can be adjusted from a lower position into an upper position and back again. With the free end 11 in the upper position, the finger element 6, 7, 8, 9 is in an upper setting, whilst, with the free end 11 in the lower position, the finger element 6, 7, 8, 9 is in a lower setting. In the represented singulation conveyor 1 there are provided finger elements 6, the free end 11 of which points in the direction of transport T, whilst the free ends 11 of other finger elements 7 point counter to the direction of transport T. Similarly, finger elements 8 which point to the, viewed in the direction of transport T of the piece goods items 3 right-hand margin of the transport track 2, whilst the free ends 11 of other finger elements 9, viewed in the direction of transport T of the piece goods items 3, point in the direction of the left-hand margin of the transport track 2, are similarly provided. The arrangement and repeated adjustment of the finger elements 6, 7, 8, 9 into the upper setting and back again ensures, together with the transport of the piece goods items 3 in the direction of transport T along the transport track 2, a separation of the piece goods items 3 which are previously fed as a pile 4 to the singulation conveyor 1, for example by joint tipping of the piece goods items 3 onto the singulation conveyor 1.

For a targeted separation of the piece goods items 3, which is preferred but not absolutely necessary, there is provided an optical sensor 12, which captures the piece goods items 3 which are to be separated or have already been partially separated and are to be separated still further. For instance, the shape of the heap or pile 4 of the piece goods items 3, their type, shape and/or size, is captured. The type and the position of the individual piece goods items 3 one to another can also be captured. Not represented but conceivable is to provide a plurality of sensors 12 for capturing the piece goods items 3 at different places on the transport track 2, so that the following separation can be made dependent on the preceding separation. From the at least one sensor 12, at least one parameter is passed on to a control device 13. The latter determines what adjustment of the finger elements 6, 7, 8, 9 to be traversed by the piece goods items 3 is suitable in order to further separate the piece goods items 3 quickly and efficient. The control device 13 then delivers an appropriate signal to an actuating device 14, which actuates the drive units 15 assigned to the finger elements 6, 7, 8, 9. A physical separation into sensor 12, control device 13, actuating device 14 and drive unit 15 is not necessary. The aforesaid sub-assemblies can also be at least partially combined.

Figure 2:
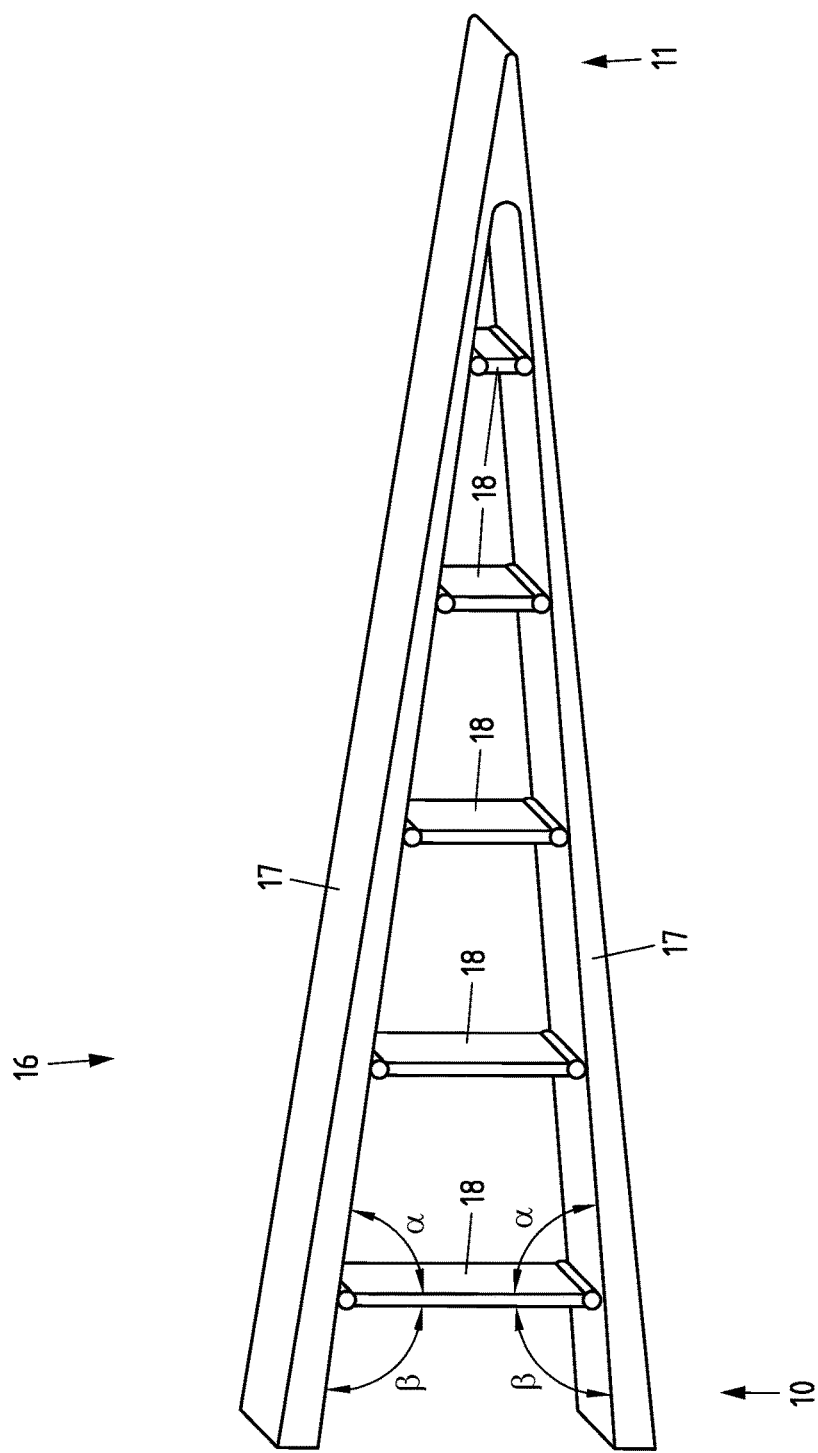
FIG. 2 shows a first finger element of a transport track of a singulation conveyor according to the invention in a perspective side view.

In FIG. 2, one possible finger element 16 of a singulation conveyor 1 is represented. The finger element 16 comprises two flank elements 17, which, in the represented and, to this extent, preferred finger element 16, run jointly from one end 10 (represented on the left) of the finger element 16, which end is connected to the transport track 2, to the opposite, free end 11 (represented on the right) of the finger element 16. The flank elements 17 here continuously converge in the direction of the free end 11 until the flank elements 17, in the represented and, to this extent, preferred finger element 16, merge at the free end 11 of the finger elements 16. A finger element 16 which narrows in one direction and is conically tapered is therefore obtained. Between the flank elements 17, cross-pieces 18, which are spread over the length of the finger element 16 and via which the flank elements 17 are connected to one another, are provided. In the represented and, to this extent, preferred finger element 16, the cross-pieces 18, at the opposite ends, are respectively pivotably, in particular articulately, connected to the flank elements 17. Alternatively, the cross-pieces 18 could be flexibly configured in order to enable a movement of the cross-pieces 18 in relation to the flank elements 17. In the represented and, to this extent, preferred finger element 16, the cross-pieces 18 are distributed at regular intervals over the length of the finger element 16. This is not absolutely necessary, however. Merely for the sake of simplicity, it is also preferred that the cross-pieces 18 run parallel to one another. It is particularly expedient, however, that the cross-pieces 18 form with each of the flank elements 16 on one side an acute angle α and on the opposite side an obtuse angle β.

Figure 3A:
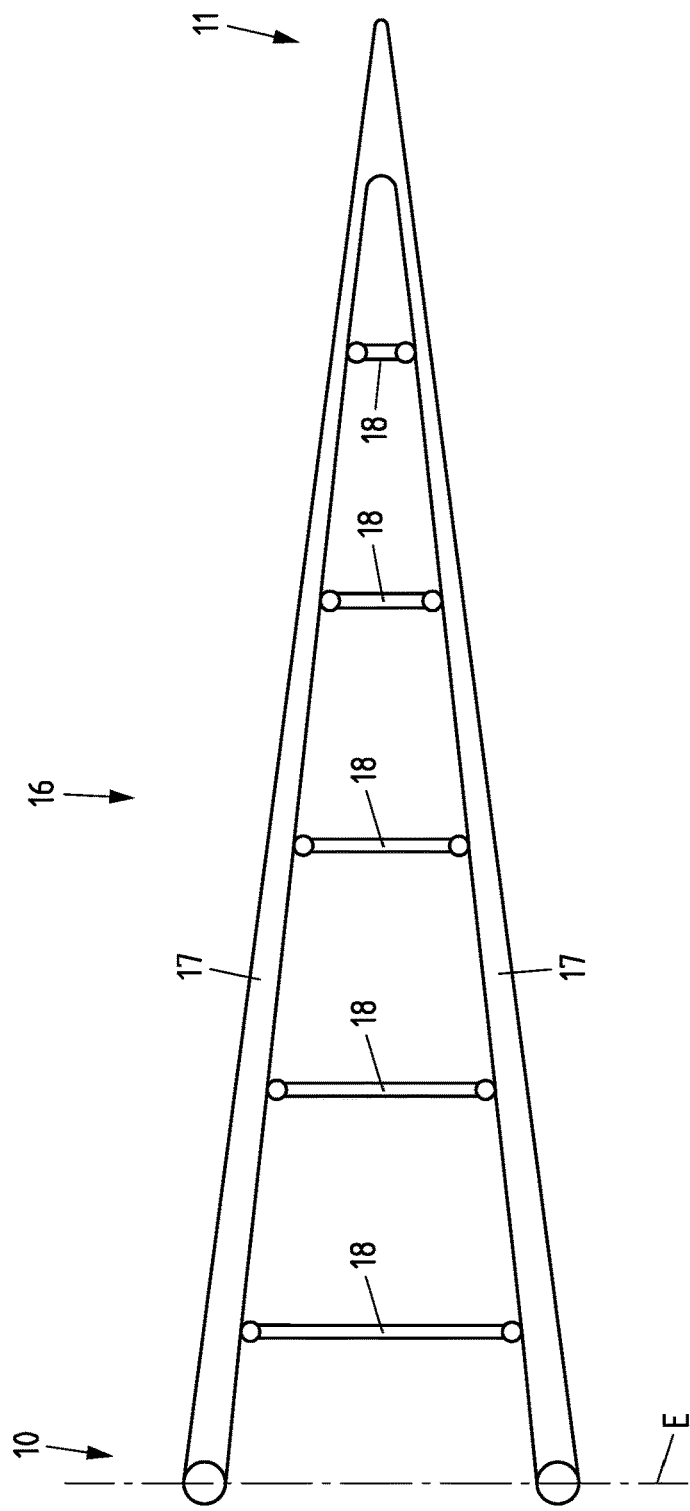
FIGS. 3A-C show the adjustment of the finger element from FIG. 2 in a perspective side view.
Figure 3B:
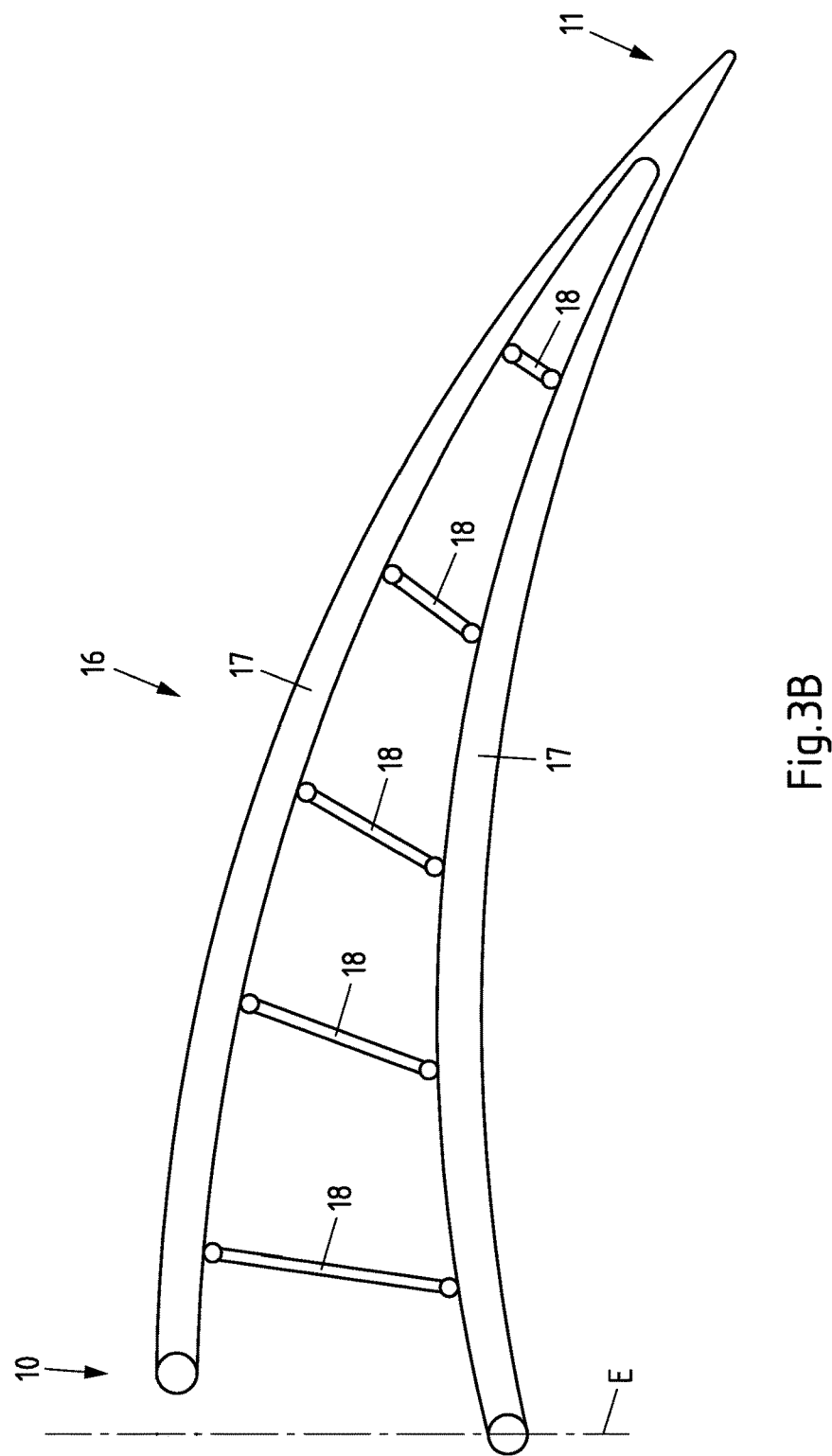
Figure 3C:
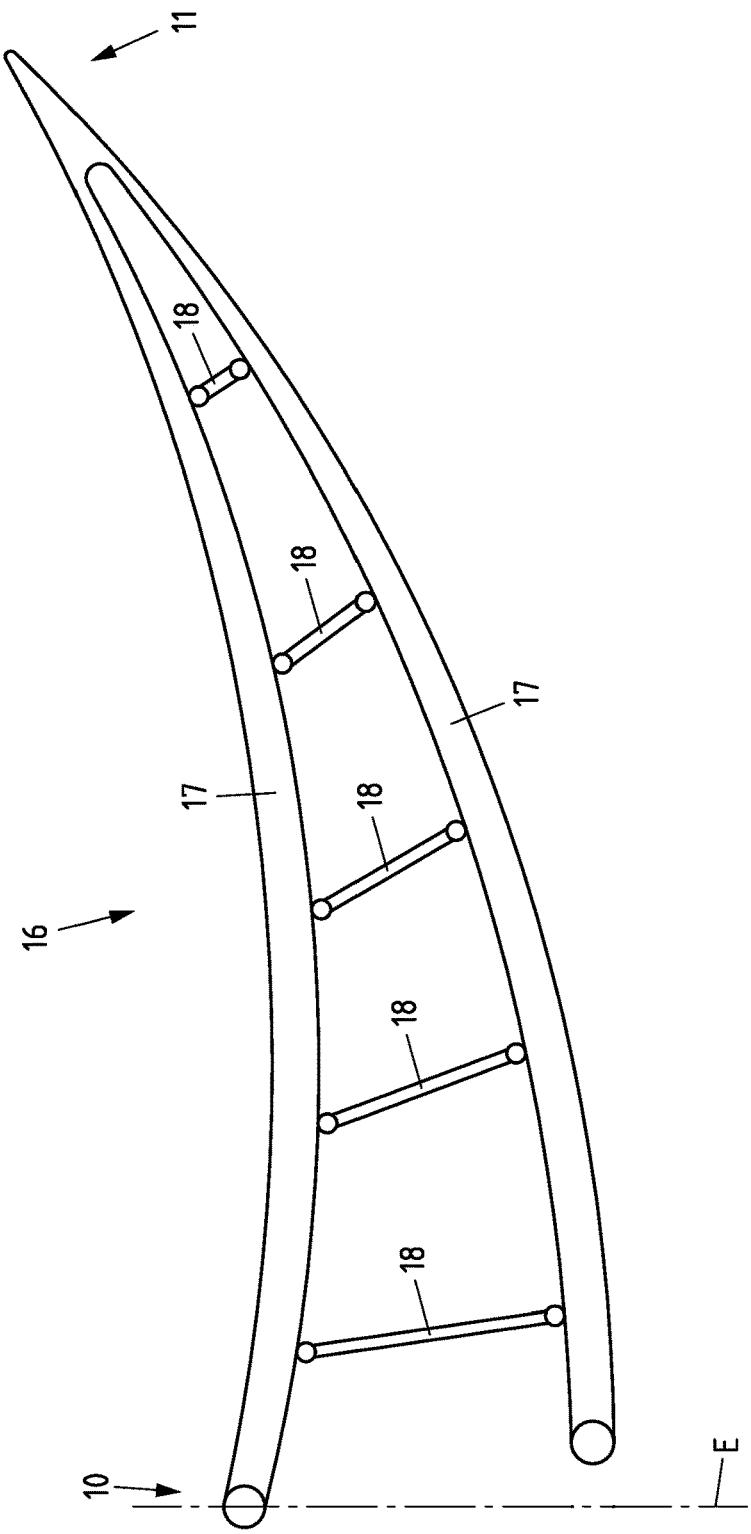

The represented and, to this extent, preferred flank elements 17 are flexibly configured, so that the flank elements 17 is able to be bent, whereupon the finger element 16 arches to a greater or lesser degree, as is represented in particular in FIGS. 3A-C. As a result of the arching of the finger elements 16 of a guiding device, the free ends of the finger elements are moved, in particular, upwards or downwards. This ultimately results in a height adjustment of the finger elements in total, even if these are fixedly connected at one end to the chute or the guiding device. For this purpose, the flank elements can be formed, for instance, of a metal or a plastic. The same applies to the cross-pieces, which do not, however, have to be flexibly configured.

In FIG. 3A, the finger element 16 from FIG. 2 is represented in an elongated orientation, in which the ends of the flank elements 17 are arranged in a plane E. In the represented and, to this extent, preferred finger element 16, the flank elements 17 are in this setting configured at least substantially symmetrically to one another. If, according to FIG. 3B, the upper flank element 17 is displaced in relation to the plane E in the direction of the free end of the finger element 16, then the finger element 16 arches downwards. To put it another way, the finger element 16 is adjusted downwards, wherein, according to requirement, a finger element 16 can be adjusted downwards or upwards, preferably in its entirety, even without an arching of the same. The arching of the represented and, to this extent, preferred finger element 16 results from the flexibility of the flank elements 17 and of the pivotable connections between the flank elements 17 and the cross-pieces 18 provided therebetween. It should here be noted that the flank elements 17 do not necessarily have to be flexibly configured over their entire longitudinal extent, even though this will often be preferred. It is also conceivable that the flank elements have rigid sections which are pivotably, in particular articulately, connected to one another, preferably by a hinge. Appropriate flank elements between two cross-pieces should have at least one pivot joint.

According to FIG. 3C, the finger element 16 analogously arches upwards if the lower flank element 17 is displaced in relation to the plane E forwards in the direction of the free end 11 of the finger element 16. In this way, an adjustment of the free end 11 of the finger element 16, as well as an adjustment of the finger element 16 respectively downwards, can thus be achieved.

From FIGS. 3A-C can further be seen that, upon the arching of the finger element 16, the cross-pieces 18 between the flank elements 17 incline in opposite directions when the finger element 16 is adjusted upwards and downwards. For the adjustment of the flank elements 16 analogously to FIG. 3A-C, a drive unit 15 (not represented) can be provided. Suitable drive units 15, such as, for example, linear drives, are known from the prior art. Moreover, it is not represented that more than two, for instance at least three or four, flank elements can be provided, for example in order to adjust the finger element, for instance, not only up and down, but also to the side. For the sake of simplicity, these then are arranged distributed, in particular evenly, about a longitudinal axis of the finger unit. The plurality of flank elements can then converge, in particular with free ends, in a common tip of the finger unit. In addition or alternatively, the cross-pieces can preferably respectively connect all flank elements one to another. The represented and, to this extent, preferred flank elements are of strip-shaped configuration. A plate-like or rod-shaped embodiment of the flank elements would, however, also be possible, as long as the flank elements enable a mutual displacement and arching of the flank elements.

Figure 4:
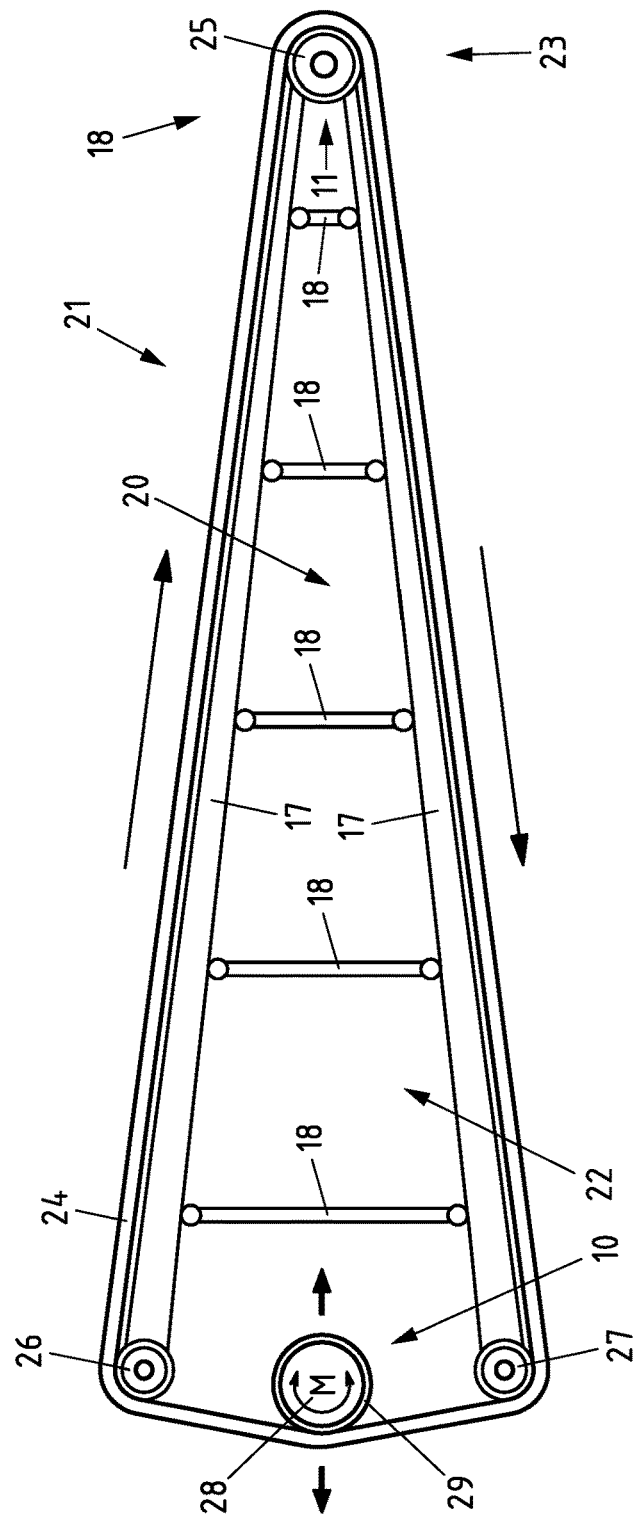
FIG. 4 shows a second finger element of a transport track of a singulation conveyor according to the invention in a perspective side view.

In FIG. 4, a finger element 20 is represented as part of or in the form of a strap conveyor 21, wherein the finger element 20, in the represented and, to this extent, preferred illustrative embodiment, forms the supporting structure 22 of the strap conveyor 21. The finger element 20 is here in principle configured analogously to the finger element 16 represented in FIG. 1. The strap conveyor 21, in particular the free end 23 of the strap conveyor 21, can therefore be adjusted upwards and downwards. The strap 24 running around the finger element 20 along the flank elements 17 here tracks the adjustment, in particular the arching, of the finger element 20 upwards and downwards. The strap 24 here runs endlessly around the supporting structure 22 and thus around the finger unit 20. For this purpose, the represented and, to this extent, preferred finger element 20 has a plurality of deflections in the form of deflection rollers 25, 26, 27. A deflection roller 25 is at the free end 11 of the finger elements 20, and respectively a further deflection roller 26, 27 at the opposite ends of the flank elements 17. The deflection rollers 25, 26, 27 are here borne by the supporting structure 22 of the finger element 20. In order that the strap 24, according to requirement, is guided close to the upper flank element 17 or to both flank elements 17 even in the case of an arched finger element 20, the strap 24 can be held via suitable connecting means at at least one place on at least the upper flank element 17.

The strap 24 of the finger element 20 can be driven by the weight force of a piece goods item 3 located on the finger element 20 in order to improve the transport of the piece goods item 3 along the finger element 20. A motor drive of the strap 24 can also be provided, however, in order to forcibly to drive the strap 24. The strap 24 here moves either on the top side of the finger element 20 in the direction of the free end 11 of the finger element 20 or in the opposite direction. In order to brake a piece goods item 3, the drive and the strap 24 can be configured to drive the strap 24 more slowly than the original speed of the piece goods item 3, or even in the opposite direction. The drive 28 acts on the strap 24 via a drive roller 29, which, according to requirement, for the tensioning of the strap 24, can be adjusted, for instance, in the longitudinal direction of the finger element 20. Moreover, for an optimally slip-free driving of the strap 24, on the strap 24 and on the drive roller 29 can be provided corresponding toothings, which intermesh. Unlike as represented in FIG. 4, the supporting structure of the finger element can have, according to requirement, still further components.

Figure 5A:
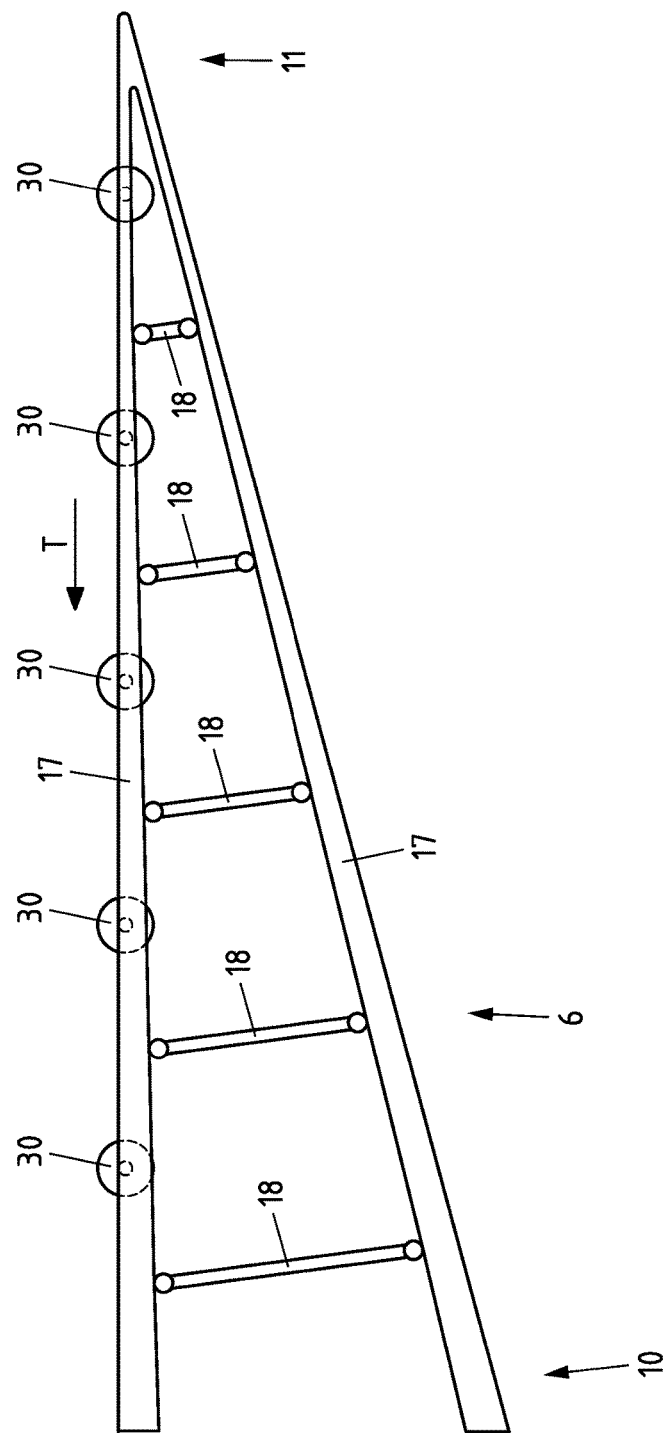

In FIGS. 5A-B is represented a finger element 6 of the singulation conveyor 1 from FIG. 1, which finger element is oriented substantially parallel to the direction of transport T of the piece goods items 3 and thus substantially parallel to the longitudinal extent of the transport track 2. The finger element 6 is represented in an elongated setting, in which the flank elements 17, and thus the finger element 6 itself, is bent or arched neither upwards nor downwards. A bending or arching at least upwards into an upper setting with the free end 11 in the upper position, starting from the represented setting, which can, but does not have to be the lower setting, is, however, readily possible. The finger element 6 further has, in addition to the flexible flank elements 17 and the cross-pieces 18 provided therebetween, rollers 30 distributed along the upper flank element 17. The rotational axes of the rollers 30 are oriented transversely to the longitudinal extent of the finger element 6. Thus the rotational axes of the rollers 30 are also oriented transversely to the direction of transport T of the piece goods items 3, so that the rollers 30 of the finger elements 6 aid the transport of the piece goods items 3 in the direction of transport T. In the represented and, to this extent, preferred finger element 6 there is respectively provided between two cross-pieces 18 a roller 30, the diameter of which is dimensioned such that the rollers 30 do not impede the arching of the finger element 6. The finger elements 7 are configured similarly to the finger elements 6, but arranged in the opposite direction.

Figure 6A:
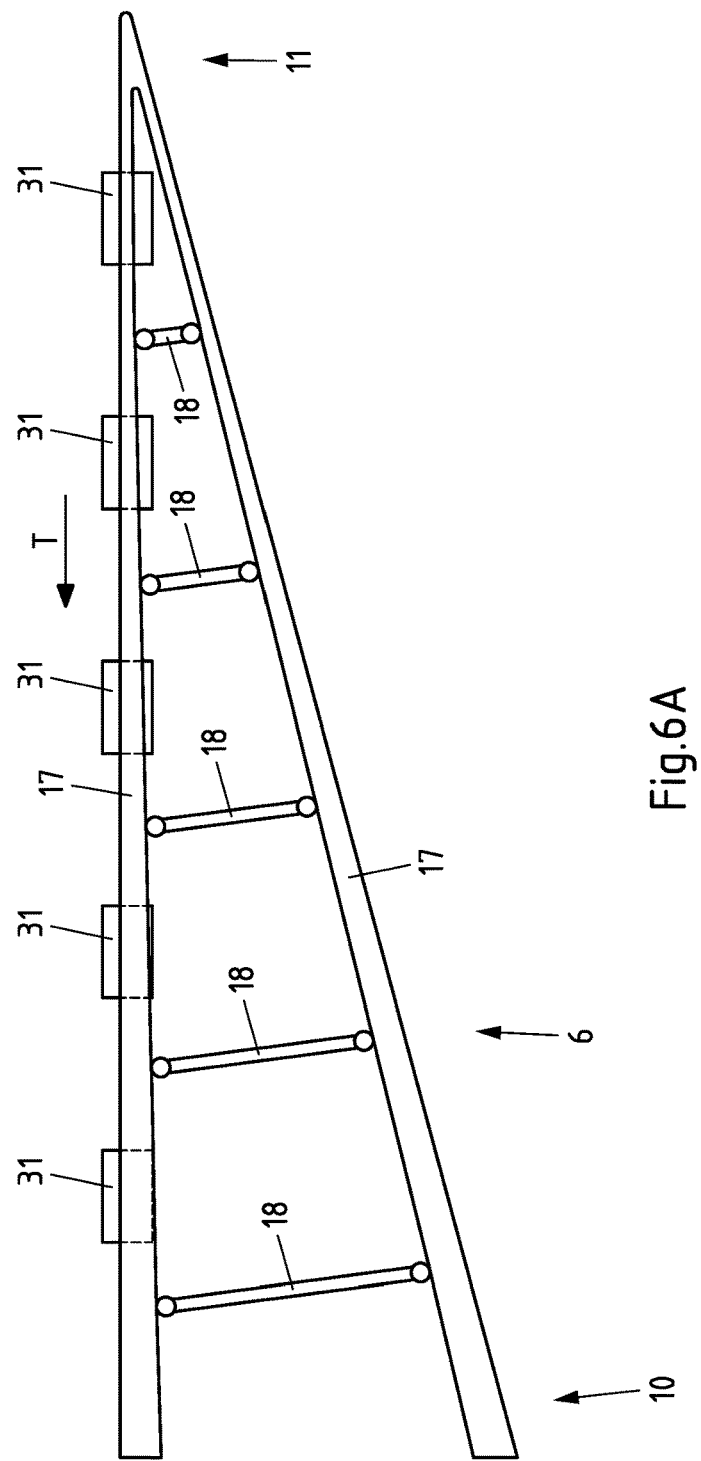
FIGS. 6A-B show an alternative finger element of the transport track from FIG. 1 in a side view and a perspective view.
Figure 6B:
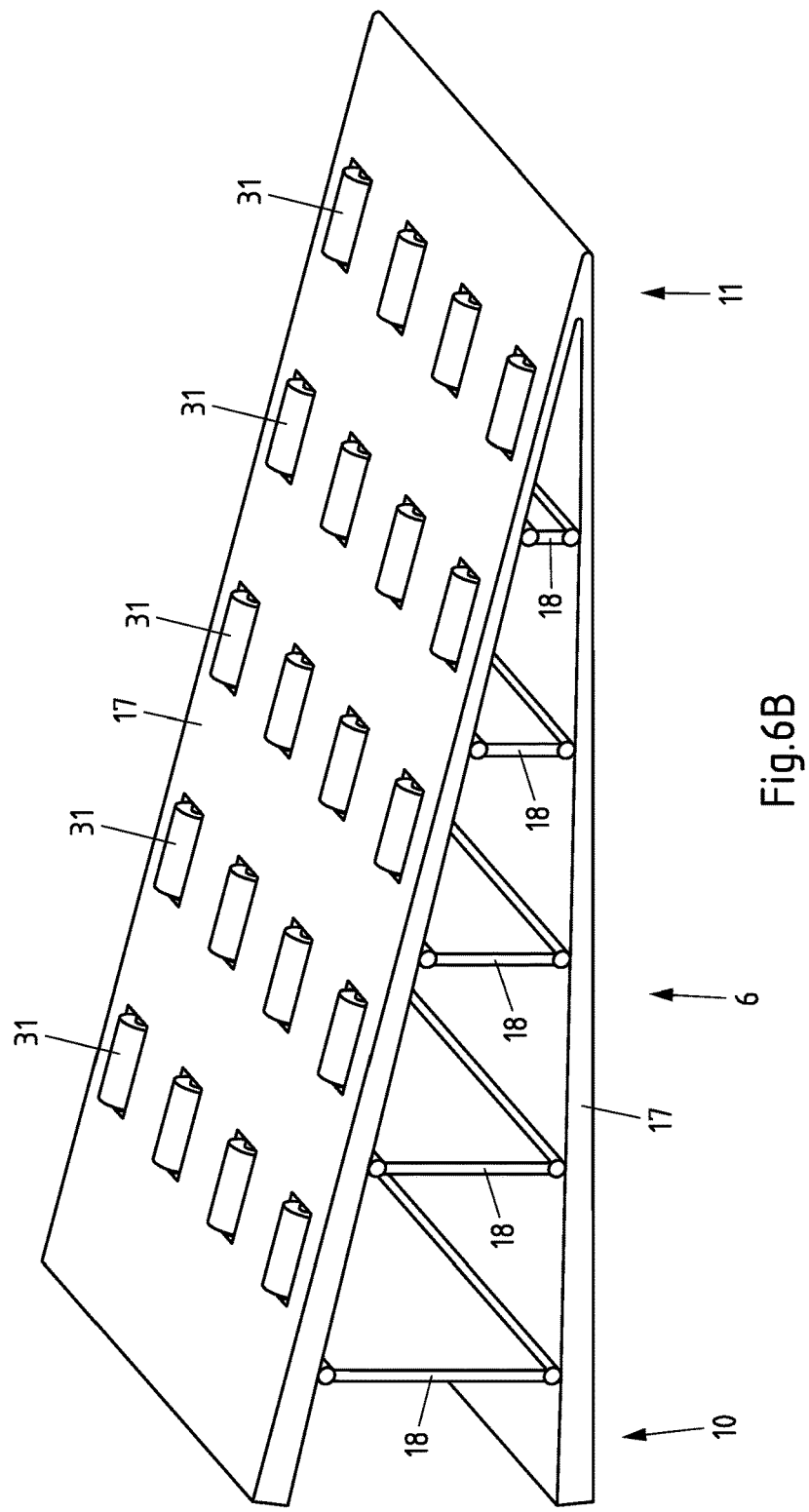

In FIGS. 6A-B is represented a finger element 8 from FIG. 1, in which rollers 31 are likewise provided on the upper flank element 17. The rotational axes of the rollers 31 are oriented, however, in the longitudinal direction of the finger element 8. As a result, the transport of the piece goods items 3 in the direction of transport T of the piece goods items 3 and along the transport track 2 is facilitated. Also in the finger element 8 represented in FIGS. 6A-B, between respectively two cross-pieces 18 is provided at least one roller 31. In fact, in the transverse direction to the finger element 8, between two cross-pieces 18 are respectively provided in a row a plurality of rollers 31, the diameter and length of which are chosen such that the arching of the finger element 8 is not hampered. The finger elements 9 are configured similarly to the finger elements 8, but arranged in the opposite direction.

In FIGS. 7A-B, the manipulation of the movement of the piece goods items 3 is represented by a finger element 6 of the singulation conveyor 1, which finger element points in the direction of transport T. Firstly, as is represented in FIG. 7A, a piece goods item 3 is advanced in the direction of transport T along the transport track 2, whereupon the finger element 6 assumes an elongated setting. After this, the piece goods item 3 makes its way onto the finger element 6, which is then adjusted into the upper setting, in which the finger element 6 is arched and the free end 11 of the finger element 6 is adjusted into the upper position, as is represented in FIG. 7B. Due to gravity, the piece goods item 3 slides down the arched finger element 6 faster than it would slide along the finger element 6 without the arching. As a result, the piece goods item 3 is thus accelerated in the direction of transport T of the piece goods item 3, to be precise preferably in absolute terms, but also relative to other piece good items 3 on the transport track 2. To put it another way, a motion component in the direction of transport T is impressed on the piece goods item 3, which motion component is superimposed on the equidirectional motional direction of the piece goods item 3 and results in an acceleration and a temporary increase in the transport speed.

In FIGS. 8A-B, the opposite manipulation of the movement of a piece goods item 3 is represented by a finger element 7 of the singulation conveyor 1, which finger element is oriented substantially parallel to the direction of transport T. Viewed from the fixed end 10 to the free end 11, the finger element 7 is here oriented substantially counter to the direction of transport T. Initially the finger element 7, as is represented in FIG. 8A, is in an elongated setting, and the piece goods item 3 is conveyed to the finger element 7. After this, the finger element 7 is adjusted into the upper setting, whereupon the free end of the finger element 7 is adjusted into the upper position, as is represented in FIG. 8B. The transport of the piece goods item 3 in the direction of transport T is thus impeded, though not prevented. The piece goods item 3 traverses the raised free end 11 of the finger element 7 and, in so doing, is braked somewhat compared with other piece goods items 3 which are transported in a straight line and are not raised by a finger element 7.

In FIGS. 9A-B is represented how the motional direction of a piece goods item 3 is manipulated by a finger element 8 of the singulation conveyor 1, which finger element is oriented transversely to the direction of transport T or to the transport track 2. In this case too, the piece goods item 3 is firstly transported to the finger element 8, as is represented in FIG. 9A. Once the piece goods item 3 is arranged at least partially on the finger element 8, the finger element 8 is arched, whereupon the free end 11 of the finger element 8 shifts into the upper position, as is represented in FIG. 9B. The finger element 8 is in the represented upper setting, in which the finger element 8, as a result of the weight force, impresses on the piece goods item 3 a motion component to the right. By a finger element 8, the free end 11 of which points in the opposite direction, a motion component to the left could be impressed in the same way on a piece goods item 3. Without an arching of appropriate finger elements 8, these can be traversed in a straight line by piece good items 3, without a motion component to the left or right being impressed, as described, on the piece goods items 3. Ultimately, no manipulation of the motional direction of the appropriate piece goods items 3 takes place, which can also be conducive to the separation from other piece goods items 3.

Figure 10A:
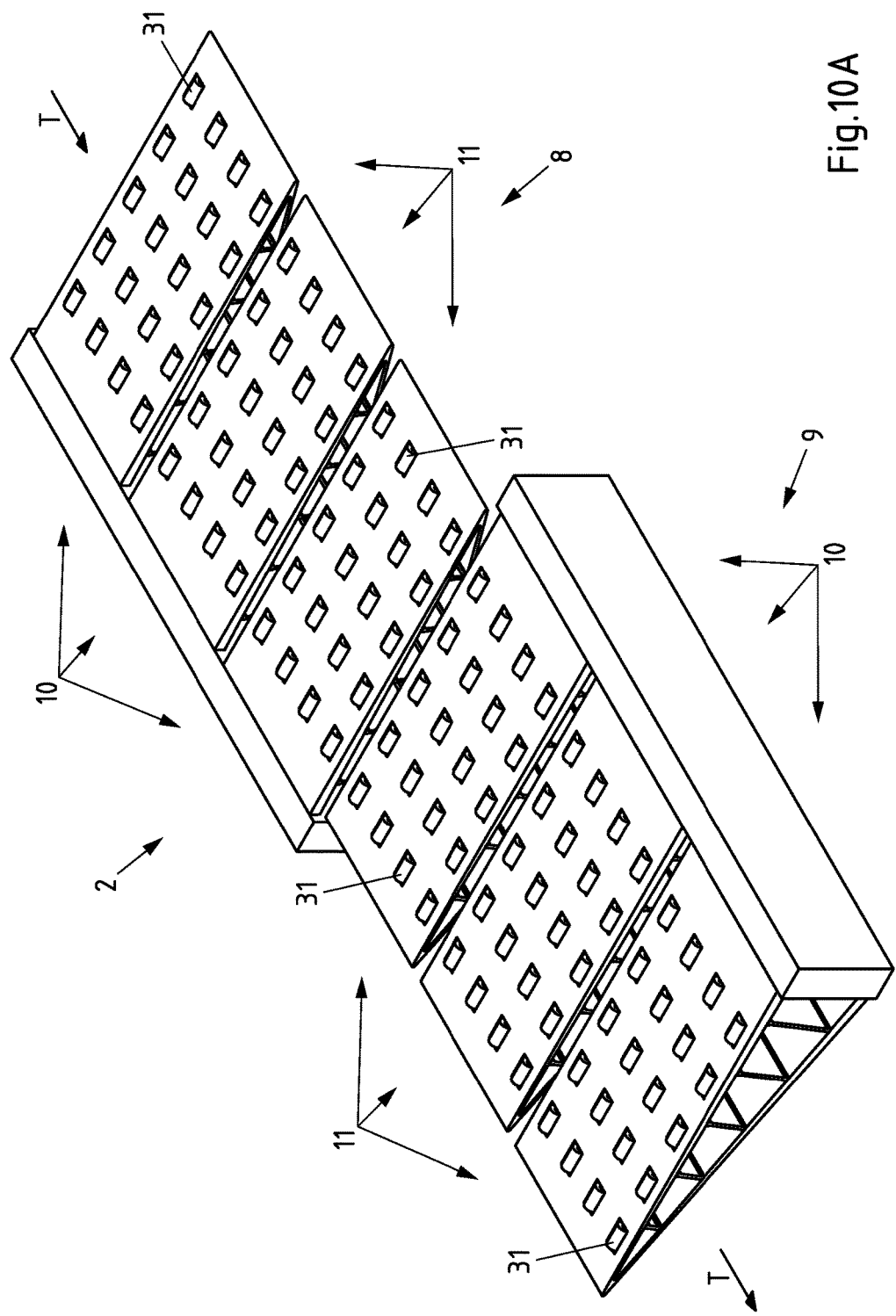
FIGS. 10A-B show two different arrangements of finger elements according to FIG. 6 in a perspective view.
Figure 10B:
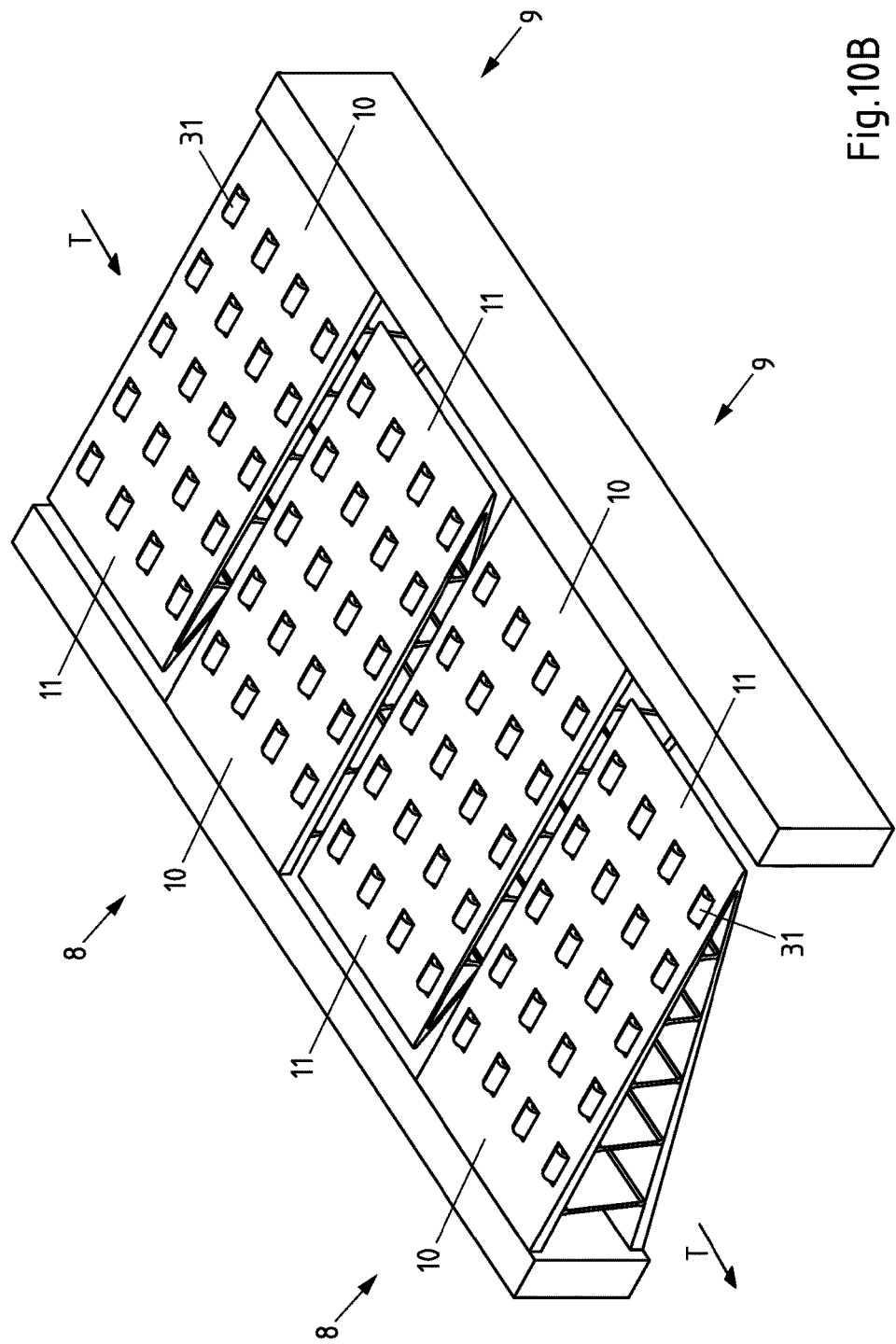

The finger elements 8, 9 oriented transversely to the transport track 2 and oppositely to each other can be arranged differently. Two different types of arrangement are represented in FIGS. 10A-B. In the first case, a plurality of finger elements 8 pointing in the same direction are provided side by side. These finger elements 8 are then followed by finger elements 9, which are likewise arranged side by side, yet which, with their free ends 11, point in the opposite direction compared with the other finger elements 8. The one group of finger elements 8 can effect a movement of the piece goods items 3 to one side of the transport track 2, and the other group of finger elements 9 a movement of the piece goods items 3 to the other side of the transport track 2. Since it typically will make less sense to move specific piece goods items 3 one after another in opposite directions, the finger elements 8, 9 can also be amalgamated in a space-saving manner into a unit, which moves the piece goods items 3 either to the left or right related to the direction of transport T of the piece goods items 3. In principle, other arrangements of the finger elements 8, 9 oriented transversely to the transport track 2 and/or of the finger elements 6, 7 oriented parallel to the direction of transport T or to the transport track 2 are also conceivable and possible, however.

Figure 11:
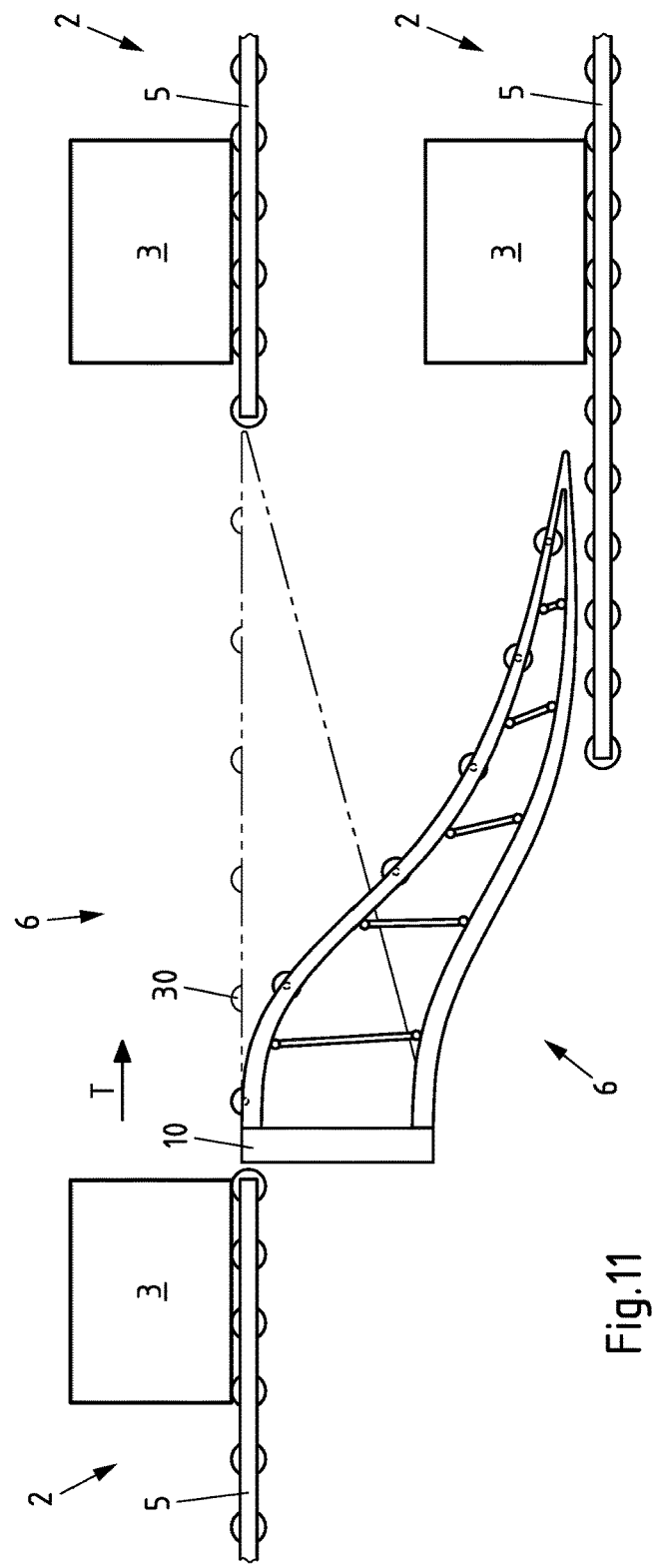
FIG. 11 shows an alternative singulation conveyor, having transport tracks arranged partially one above another, in a schematic side view.

In FIG. 11, a singulation conveyor 1 having two transport tracks 2 arranged partially one above the other is represented schematically. In order to convey a piece goods item 3 from the upper transport track 2 onto the below-situated transport track 2, at least one finger element 6 can be adjusted into a lower setting. The piece goods item then slides along the at least one finger element 6 downwards onto the lower transport track 2, where a further separation of the piece goods items 3 can take place.

Figure 12:
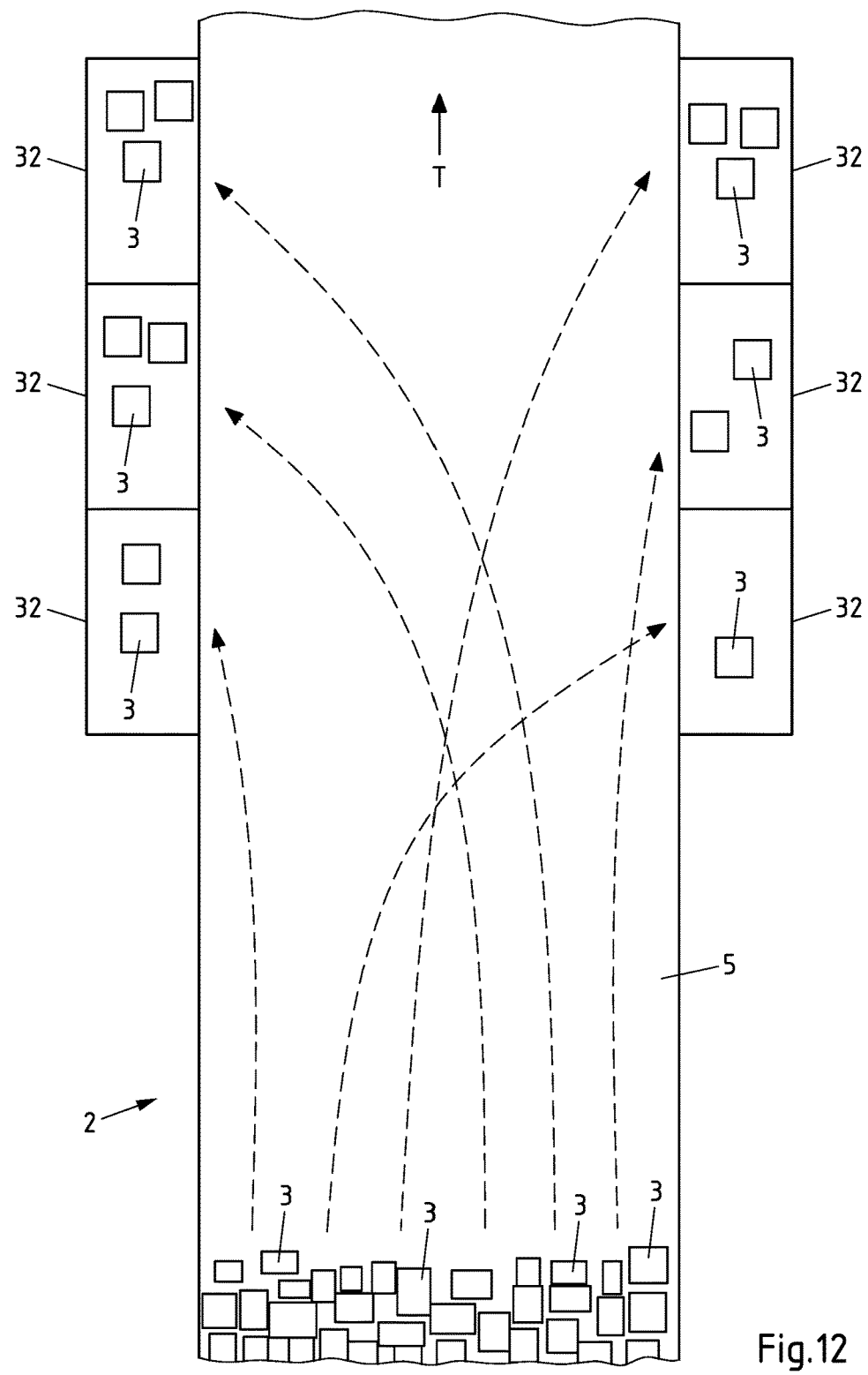
FIG. 12 shows the sorting of piece goods items along a transport track in a schematic top view.

In FIG. 12, the sorting of the piece goods items 3 along the transport track 2 and the lateral discharging of the sorted piece goods items 3 at places provided for this purpose is represented schematically. As has already been described, the piece goods items 3 are separated, but so that the piece goods items 3 are simultaneously sorted. The piece goods items 3 are here moved by the adjustment of the finger elements 6, 7, 8, 9, 16, 20 (for the sake of better clarity not represented in FIG. 12) to a specific side of the transport track 2, to be precise such that the piece goods items 3 of same category, at the places provided for this purpose, make their way down to the side of the transport track 2 and are subsequently collected in collecting means 32 or immediately further processed. For the sake of better clarity, the sorting of the piece goods items 3 is represented by arrows.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A singulation conveyor for conveying and separating piece goods, in particular packages and/or consignments, along at least one transport track bearing the piece goods items, wherein in the transport track, in some sections, finger elements adjustable between a lower setting and an upper setting are provided, and in that the free ends of the finger elements in the upper setting are arranged in an upper position above an adjoining region of the transport track in such a way as to manipulate the motional direction and/or the motional speed of respectively individual piece goods items independently of other piece goods items, wherein the finger elements respectively have at least two flexible flank elements which extend jointly in the longitudinal direction of the finger element at least substantially up to the free end of the finger element, and in that the flexible flank elements are flexibly connected to one another in the longitudinal direction of the finger elements respectively via a plurality of cross-pieces, so that the free ends of the finger elements can be adjusted from a lower setting into an upper setting and back.

2. The singulation conveyor according to claim 1, wherein, contiguous to the finger elements, the transport track comprises at least one of a roller conveyor, a strap conveyor or a belt conveyor except where the transport track comprises finger elements.

3. The singulation conveyor according to claim 1, wherein at least some finger elements point in the direction of the free ends at least substantially in the direction of transport of the piece goods items along the transport track and/or at least substantially counter to the direction of transport of the piece goods items along the transport track.

4. The singulation conveyor according to claim 3, wherein the width at least of some finger elements transversely to the transport track is less than 50%, preferably less than 23%, in particular less than 18%, further particularly less than 10%, of the width of the transport track in the region of the finger elements, and/or the length at least of some finger elements in the direction of the free end is less than 18%, preferably less than 10%, in particular less than 5%, further particularly less than 2%, of the length of the transport track.

5. The singulation conveyor according to claim 1, wherein at least some finger elements point at least substantially in the direction of the free ends, preferably in opposite directions, transversely to the direction of transport of the piece good items along the transport track.

6. The singulation conveyor according to claim 5, wherein the length at least of some finger elements in the direction to the free end transversely to the transport track is less than 50%, preferably less than 23%, in particular less than 18%, further particularly less than 10%, of the width of the transport track in the region of the finger elements, and/or in that the width at least of some finger elements is less than 10%, preferably less than 5%, in particular less than 2%, further particularly less than 1%, of the length of the transport track.

7. The singulation conveyor according to claim 1, wherein the finger elements have transport means for transporting the piece goods items, preferably in the direction of transport of the piece goods items along the transport track, in particular in the form of rollers, rolls, belts or straps.

8. The singulation conveyor according to claim 1, wherein the at least one transport track is formed at least in some sections, in particular contiguously to at least some finger elements, by at least one roller conveyor and/or belt conveyor.

9. The singulation conveyor according to claim 1, wherein at least in some sections, two transport tracks are provided one above the other, and in that finger elements of a transport track in the upper setting and/or in the lower setting form a connection of one transport track to the at least one other transport track in order to conduct piece goods items from one transport track to the other transport track.

10. The singulation conveyor according to claim 1, wherein the cross-pieces and the associated flexible flank elements respectively exhibit an acute angle α, preferably between 10° and 80°, and an obtuse angle β, preferably between 100° and 170°.

11. The singulation conveyor according to claim 1, wherein the flexible flank elements of the finger elements are respectively mutually adjustable, in particular via a drive unit, in the longitudinal direction of the finger elements such that the finger elements are arched to a greater or lesser degree in the vertical direction by a mutual adjustment of the flexible flank elements.

12. The singulation conveyor according to claim 1, wherein at least one, preferably optical, sensor is provided to capture the number and/or type of individual piece goods items, the position of individual piece goods items, the dimensions of individual piece goods items, the arrangement of a heap or pile of piece goods items and/or the shape of a heap or pile of piece goods items.

13. The singulation conveyor according to claim 12, wherein at least one control device for controlling the adjustment of at least some finger elements on a time-dependent basis, in dependence on the number and/or type of individual stored piece goods items and/or in dependence on at least one parameter captured by the sensor, is provided.

14. The singulation conveyor according to claim 12, an actuating device for adjusting the height of the free ends of the finger elements on a time-dependent basis, in dependence on the number and/or type of individual stored piece goods items, in dependence on at least one parameter captured by the sensor and/or in dependence on signals of the control device is provided.

15. A method for conveying and separating piece goods, in particular packages and/or consignments, along at least one transport track of a singulation conveyor, which transport track bears the piece goods items, wherein in the transport track, in some sections, finger elements adjustable between a lower setting and an upper setting are provided, wherein the free ends of the finger elements in the upper setting are arranged in an upper position above an adjoining region of the transport track, in which the finger elements are repeatedly adjusted out of the lower setting into the upper setting so as to manipulate the motional direction and/or the motional speed of respectively individual piece goods items independently of other piece goods items, and in which the piece goods items are separated by the repeated adjustment of the finger elements out of the lower setting into the upper setting along the transport track and/or transversely to the transport track;

wherein the finger elements respectively have at least two flexible flank elements which extend jointly in the longitudinal direction of the finger element at least substantially up to the free end of the finger element, and in that the flexible flank elements are flexibly connected to one another in the longitudinal direction of the finger elements respectively via a plurality of cross-pieces, so that the free ends of the finger elements can be adjusted from the lower setting into the upper setting and back.

16. The method according to claim 15, in which individual piece goods items are accelerated, in particular in relation to other adjoining piece goods items, by the adjustment of finger elements, pointing in the direction of transport of the transport track, from the lower setting into the upper setting and/or in which individual piece goods items are braked, in particular in relation to other adjoining piece goods items, by the adjustment of finger elements, pointing counter to the direction of transport of the transport track, from the lower setting into the upper setting.

17. The method according to claim 15, in which individual piece goods items are moved, in particular in relation to other adjoining piece goods items, in a direction, in particular in opposite directions, transversely to the direction of transport, by the adjustment of finger elements pointing transversely to the direction of transport of the transport track, from the lower setting into the upper setting.

18. The method according to claim 15, in which, at least temporarily, some finger elements are arranged in the upper, and some finger elements, in particular pointing in the same direction and/or the opposite direction, are arranged in the lower setting.

19. The method according to claim 15, in which, with at least one, in particular optical, sensor, piece goods items on the transport track, which piece goods items are to be separated, are captured, in which at least one control device, on the basis of the parameters captured by the at least one sensor, determines an adjustment of at least individual of the finger elements, to be traversed by the piece goods items to be separated, for the separation of the piece goods items.

20. The method according to claim 19,
in which the control device sends signals, to actuating devices for adjustment of the finger elements, to adjust the finger elements such that the piece goods items to be separated are separated.

21. The method according to claim 15,
in which, by the adjustment of finger elements into an upper setting and/or into a lower setting, piece goods items are led from one transport track onto at least one other transport track arranged at least partially above and/or below it.

22. The method according to claim 21,
in which the piece goods items are separated on the at least two transport tracks by the repeated adjustment of finger elements of the respective transport track out of the lower setting into the upper setting along the respective transport track and/or transversely to the respective transport track.

23. The method according to claim 15,
in which, by the repeated adjustment of finger elements of the respective transport track out of the lower setting into the upper setting, the piece goods items are sorted along the respective transport track and/or transversely to the respective transport track and, preferably,
in which the piece goods items at predetermined places are moved down to at least one side of the transport track.

* * * * *